(12) United States Patent
Sugihara et al.

(10) Patent No.: US 7,774,509 B2
(45) Date of Patent: Aug. 10, 2010

(54) COMMAND CONVERSION DEVICE AND CHARGING DEVICE FOR CONTENT REPRODUCTION DEVICE

(75) Inventors: Shogo Sugihara, Neyagawa (JP); Masahiro Suzuki, Neyagawa (JP); Koji Harada, Neyagawa (JP); Masahiro Kashiwai, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 234 days.

(21) Appl. No.: 11/323,670

(22) Filed: Dec. 30, 2005

(65) Prior Publication Data
US 2006/0200601 A1    Sep. 7, 2006

(30) Foreign Application Priority Data
Mar. 3, 2005  (JP) .............................. 2005-058996

(51) Int. Cl.
G06F 3/00 (2006.01)

(52) U.S. Cl. ................... 710/5; 710/8; 710/11; 710/33; 710/62; 710/65; 710/69; 710/70; 710/71; 710/72; 330/72; 330/73

(58) Field of Classification Search ................... 330/72, 330/73; 710/5, 8, 11, 33, 6, 65, 69, 70, 71, 710/72

See application file for complete search history.

(56) References Cited

U.S. PATENT DOCUMENTS

| | | | |
|---|---|---|---|
| 5,321,846 A | | 6/1994 | Yokota et al. |
| 5,473,317 A | * | 12/1995 | Inomata et al. ......... 340/825.25 |
| 5,477,275 A | | 12/1995 | Toyoshima et al. |
| 6,133,910 A | * | 10/2000 | Stinebruner .................. 725/49 |
| 6,400,280 B1 | | 6/2002 | Osakabe |
| 6,636,157 B1 | * | 10/2003 | Sato ....................... 340/825.22 |
| 6,754,719 B1 | * | 6/2004 | Nakatsugawa ............... 709/251 |
| 6,868,296 B1 | | 3/2005 | Arikuma et al. |
| 7,209,980 B2 | * | 4/2007 | Wugofski et al. ............... 710/5 |
| 2004/0064598 A1 | * | 4/2004 | Nakano ....................... 710/11 |
| 2004/0168002 A1 | * | 8/2004 | Accarie et al. ................ 710/62 |
| 2004/0193647 A1 | | 9/2004 | Ueda et al. |
| 2005/0091414 A1 | | 4/2005 | Ichikawa et al. |

FOREIGN PATENT DOCUMENTS

| | | |
|---|---|---|
| JP | 58-175320 | 10/1983 |
| JP | 02-181600 | 7/1990 |

(Continued)

*Primary Examiner*—Tariq Hafiz
*Assistant Examiner*—Jasjit S Vidwan
(74) *Attorney, Agent, or Firm*—Renner, Otto, Boisselle & Sklar, LLP

(57) ABSTRACT

A command conversion device 14 is connected between an amplifier device 11 and a portable player 13. The amplifier device 11 sends/receives a plurality of types of first commands corresponding to a plurality of types of devices (e.g., CD players, MD recorders, tape recorders, etc.), and performs an operation based on a received first command. The portable player 13 sends/receives a second command, and performs an operation based on a received second command. The command conversion device 14 includes a selector for selecting a type of a first command, and a converter. When a first command of the type selected by the selector is received from the amplifier device 11, the converter converts the received first command into a second command, and sends the second command to the portable player 13.

14 Claims, 24 Drawing Sheets

| | FOREIGN PATENT DOCUMENTS | | |
|---|---|---|---|
| JP | 04-037394 | 2/1992 | |
| JP | 06-236666 | 8/1994 | |
| JP | 06-245267 | 9/1994 | |
| JP | 07-147563 | 6/1995 | |
| JP | 07-264677 | 10/1995 | |
| JP | 08-051676 | 2/1996 | |
| JP | 08-149580 | 6/1996 | |
| JP | 09-063256 | 3/1997 | |
| JP | 10-178686 | 6/1998 | |
| JP | 2000-83287 | 3/2000 | |
| JP | 2000-261466 | 9/2000 | |
| JP | 2000-331431 | 11/2000 | |
| JP | 2000-399840 | 12/2000 | |
| JP | 2002-142182 | 5/2002 | |
| JP | 2002-345057 | 11/2002 | |
| JP | 2003-69882 | 3/2003 | |
| JP | 2003-298975 | 10/2003 | |
| JP | 2004-88759 | 3/2004 | |
| JP | 2004-241925 | 8/2004 | |

\* cited by examiner

FIG. 4A

|  | FIRST COMMAND ||||  SECOND COMMAND |
| --- | --- | --- | --- | --- | --- |
|  | TAPE | CD | MD | DVD | PORTABLE PLAYER |
| SYSTEM_ON | PON |||| PowerON |
| SYSTEM_OFF | POFF |||| PowerOFF |
| DIRECT_PLAY | TAPE DPLY | CD DPLY | MD DPLY | DVD DPLY | Play |
| POWER_ON | TAPE POWERON | CD POWERON | MD POWERON | DVD POWERON | PowerON |
| PLAY | TAPE PLAY | CD PLAY | MD PLAY | DVD PLAY | Play |
| PAUSE | TAPE PAUSE | CD PAUSE | MD PAUSE | DVD PAUSE | Pause |
| STANDBY | TAPE STANBY | CD STANBY | MD STANBY | DVD STANBY | PowerOFF |
| STOP | TAPE STOP | CD STOP | MD STOP | DVD STOP | Stop |
| FAST-FORWARD | TAPE FF | CD FF | MD FF | DVD FF | Ff |
| REWIND | TAPE REW | CD REW | MD REW | DVD REW | Rew |
| SKIP_UP | TAPE SKIP UP | CD SKIP UP | MD SKIP UP | DVD SKIP UP | SkipUp |
| SKIP_DOWN | TAPE SKIP DOWN | CD SKIP DOWN | MD SKIP DOWN | DVD SKIP DOWN | SkipDown |
| BACKLIGHT | TAPE DISPLAY | CD DISPLAY | MD DISPLAY | DVD DISPLAY | BackLightOn |
| PLAYLIST | TAPE PROGRAM | CD PROGRAM | MD PROGRAM | DVD PROGRAM | PlayListUp |

FIG. 4B

|  | SECOND COMMAND | FIRST COMMAND ||||
| --- | --- | --- | --- | --- | --- |
|  | PORTABLE PLAYER | TAPE | CD | MD | DVD |
| AUTO_POWER_ON | PowerON | TAPE DCHG | CD DCHG | MD DCHG | DVD DCHG |
| DIRECT_CHANGE | Play | TAPE DCHG | CD DCHG | MD DCHG | DVD DCHG |
| TIMER_ON | TimerPowerON | TAPE DCHG | CD DCHG | MD DCHG | DVD DCHG |
| TIMER_OFF | TimerPowerOff | POFF ||||

COMMAND CONVERSION DEVICE AND CHARGING DEVICE FOR CONTENT REPRODUCTION DEVICE

BACKGROUND OF THE INVENTION

1. Field of the Invention

The present invention relates to a command conversion device connected between an amplifier device and a content reproduction device for allowing the amplifier device and the content reproduction device to be controlled from each other.

2. Description of the Related Art

There are conventional systems in which a plurality of reproduction devices (CD players, MD recorders, etc.) are connected to a plurality of audio input terminals of an amplifier device, wherein the amplifier device and the reproduction devices are controlled from each other by exchanging commands therebetween. In such a system, for example, when the power of the amplifier device is turned ON, the amplifier device sends a reproduction device a command to turn the power ON. In response to the command, the reproduction device turns the power ON. When a reproduction device starts reproducing a content item, the content reproduction device sends the amplifier device a command to "turn ON the power and switch the selector". In response to the command, the amplifier device turns ON the power thereof and switches the selector to the audio input terminal to which the reproduction device is connected. Thus, as the operator operates one of the amplifier device and the reproduction device, the other device automatically performs an operation corresponding to the operator's operation. This eliminates the need for the operator to operate both the amplifier device and the reproduction device, thus making the operation much easier.

Commands exchanged between the amplifier device and a reproduction device are unique to the type of the device connected to the amplifier device. For example, CD player commands are used for controlling the amplifier device and a CD player from each other. MD recorder commands are used for controlling the amplifier device and an MD recorder from each other. The MD recorder cannot be operated by a CD player command even if it is received from the amplifier device. This prevents an erroneous operation of a reproduction device connected to the amplifier device.

However, a conventional system as described above has the following problem. If the reproduction device connected to the amplifier device is incompatible with commands that can be used with the amplifier device, the reproduction device and the amplifier device cannot be controlled from each other. Then, the operator needs to operate each of the amplifier device and the reproduction device separately, which is quite time-consuming. For example, if a portable reproduction device (e.g., a hard disk player) that is incompatible with commands that can be used with the amplifier device is connected to the amplifier device, the operator needs to press a key on the portable reproduction device to bring it to a play mode, turn ON the power of the amplifier device, and switch the selector of the amplifier device to the audio input terminal to which the hard disk player is connected.

SUMMARY OF THE INVENTION

It is therefore an object of the present invention to provide a system in which an amplifier device and a reproduction device incompatible with commands that can be used with the amplifier device can be controlled from each other.

A command conversion device according to a preferred embodiment of the present invention includes: a connector to be connected to an amplifier device for sending/receiving a plurality of types of first commands and performing an operation based on a received first command and to a content reproduction device for sending/receiving a second command and performing an operation based on a received second command; a selector for selecting a type of a first command; and a converter for, when a first command of the type selected by the selector is received from the amplifier device, converting the received first command into a second command and sending the second command to the content reproduction device.

The amplifier device sends a first command to the command conversion device. When the command conversion device receives a first command of the type selected by the selector from the amplifier device, the command conversion device converts the first command into a second command, and sends the second command to the content reproduction device. The content reproduction device performs an operation based on the second command. As a result, even a content reproduction device that cannot be operated by a first command can perform an operation based on a first command from the amplifier device. Moreover, the command conversion device can be connected to any of a plurality of audio input terminals of the amplifier device, and the selector selects the same device type as that of the audio input terminal to which the command conversion device is connected. Therefore, with the operator simply inputting a command to operate a device of the type selected by the selector (e.g., a command to operate a tape recorder where "tape recorder" is being selected by the selector) to the amplifier device, it is possible to operate a content reproduction device that is not compatible with first commands. Thus, the command conversion device can be connected to any audio input terminal of the amplifier device, i.e., to any audio input terminal to which no content reproduction device is being connected.

In a preferred embodiment, when a second command is received from the content reproduction device, the converter converts the second command into a first command of the type selected by the selector and sends the first command to the amplifier device.

The content reproduction device sends a second command to the command conversion device. When the command conversion device receives a second command from the content reproduction device, the command conversion device converts the second command into a first command of the type selected by the selector, and sends the first command to the amplifier device. The amplifier device performs an operation based on the first command. As a result, even a content reproduction device that cannot send a first command can control the amplifier device by sending a second command. Moreover, the command conversion device can be connected to any of a plurality of audio input terminals of the amplifier device, and the selector selects the same device type as that of the audio input terminal to which the command conversion device is connected. Therefore, the amplifier device can determine that a first command has been sent from a reproduction device of the type selected by the selector. For example, the command conversion device is connected to the "tape recorder" audio input terminal, and the selector selects "tape recorder". When the content reproduction device starts reproducing a content item, the amplifier device can control the selector circuit to select the "tape recorder" audio input terminal based on a first command from the command conversion device (a first command of the device type "tape recorder").

In a preferred embodiment, the converter includes: a command conversion table containing the plurality of types of first commands each associated with a second command; and a conversion section for converting a first command into a second command associated with the first command or converting a second command into a first command associated with the second command based on a selection status of the selector and the command conversion table.

When the command conversion device receives a first command from the amplifier device, the conversion section converts the first command into a second command based on the command conversion table and sends the second command to the content reproduction device, if the first command is of the type selected by the selector. When the command conversion device receives a second command from the content reproduction device, the conversion section converts the second command into a first command of the type selected by the selector based on the command conversion table, and sends the first command to the amplifier device. Therefore, because the command converter includes the conversion section and the command conversion table, even a content reproduction device that is not compatible with first commands can be controlled from the amplifier device and the amplifier device can be controlled from the content reproduction device.

In a preferred embodiment, when a first command of a type that is not being selected by the selector is received from the amplifier device, the converter does not send the second command corresponding to the received first command to the content reproduction device.

When the command conversion device receives a first command from the amplifier device, the command conversion device does not send a corresponding second command to the content reproduction device if the received first command is not of the type selected by the selector. As a result, it is possible to prevent the content reproduction device from erroneously performing an operation in response to an operation by the operator.

In a preferred embodiment, the command conversion device further includes: a connection detector for determining whether or not the content reproduction device is connected; a command input section; a determination section for determining whether or not the command input section is operated; and a command transmitter for sending a first command to the amplifier device and/or sending a second command to the content reproduction device based on the decision by the connection detector and the decision by the determination section.

In a preferred embodiment, if the determination section determines that the command input section is operated and the connection detector determines that the content reproduction device is connected, the command transmitter sends the amplifier device a first command to turn a power ON or a first command to select an audio signal input terminal of the type selected by the selector and sends the content reproduction device a second command to start a reproduction operation. If the determination section determines that the command input section is operated and the connection detector determines that the content reproduction device is not connected, the command transmitter sends the amplifier device a first command to turn a power OFF.

When the command input section is operated (e.g., when the command input button is pressed) while the content reproduction device is being connected to the command conversion device, the command transmitter of the command conversion device sends a first command to the amplifier device and sends a second command to the content reproduction device. The amplifier device can automatically turn ON the power supply unit and appropriately switch the selector circuit based on the received first command. The content reproduction device can automatically start reproducing a content item based on the received second command. On the other hand, when the command input section is operated while the content reproduction device is not being connected to the command conversion device, the command transmitter of the command conversion device sends a first command to the amplifier device. The amplifier device turns OFF the power supply unit based on the received first command. Moreover, the amplifier device sends a first command to turn the power OFF to content reproduction devices (e.g., a CD player) other than the content reproduction device connected to the command conversion device. These content reproduction devices turn OFF the power supply unit based on the received first command. Therefore, with the operator simply operating the command input section of the command conversion device, it is possible to send an optimal first command to the amplifier device (and other content reproduction devices) based on the connection status. Moreover, it is possible to send an optimal second command to the content reproduction device. This eliminates the need for the operator to determine and input an appropriate command to the amplifier device and to the content reproduction device based on a desired operation to be performed, thus significantly simplifying the operation.

In another aspect of the present invention, there is provided a charging device for a content reproduction device. The charging device includes: a command conversion device as set forth above; a power supply circuit for supplying a power supply voltage to the content reproduction device; an audio signal receiver for receiving an audio signal from the content reproduction device; and an audio signal transmitter for sending the audio signal to the amplifier device.

Because the command conversion device is provided in the charging device for supplying the power supply voltage to the content reproduction device, the content reproduction device can be very easily connected to the command conversion device by simply placing the content reproduction device onto or into the charging device. Moreover, the conversion between a first command and a second command can be performed while supplying the power to the content reproduction device at the same time.

According to the present invention, a command conversion device includes a selector and a converter, whereby even a content reproduction device that is not compatible with first commands can be controlled from an amplifier device and the amplifier device can be controlled from the content reproduction device.

BRIEF DESCRIPTION OF THE DRAWINGS

FIGS. 4A and 4B are schematic diagrams showing a command conversion table 203A.

DETAILED DESCRIPTION OF THE PREFERRED EMBODIMENTS

Figure 1:
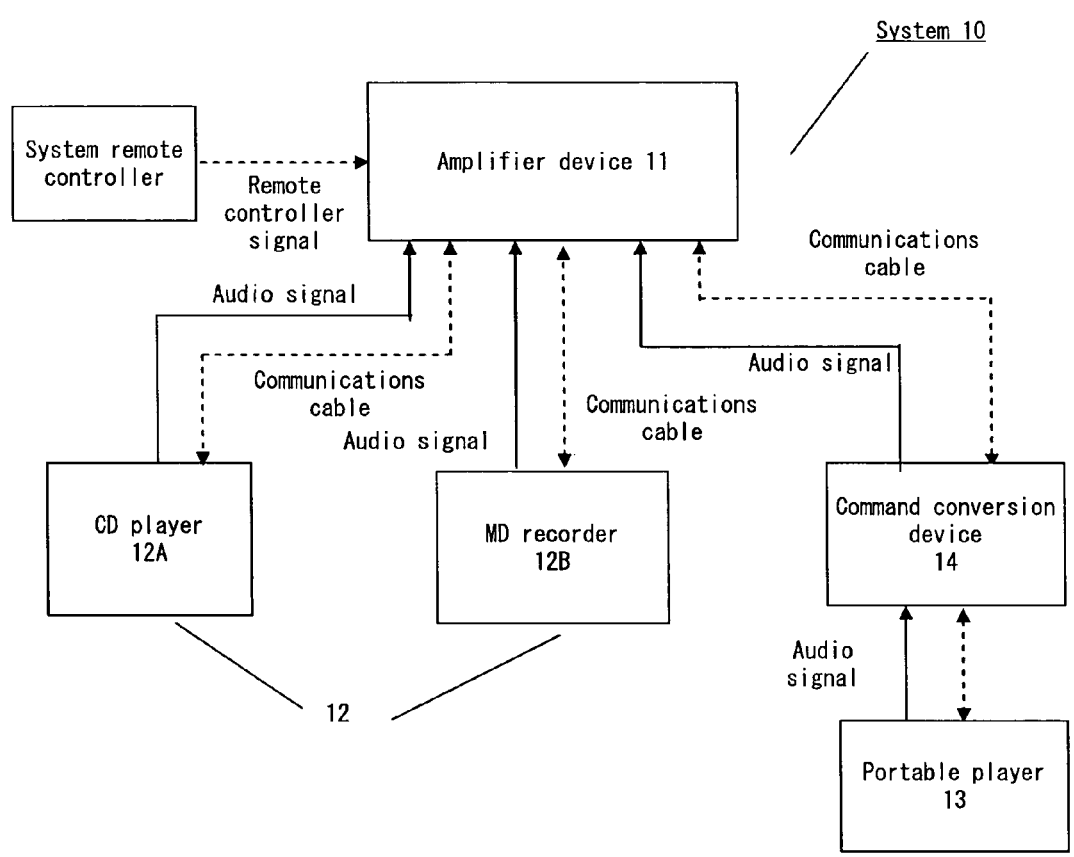
FIG. 1 is a block diagram showing a content reproduction system 10.

While preferred embodiments of the present invention will now be described with reference to the drawings, it is understood that the present invention is not limited thereto. FIG. 1 is a schematic diagram showing a content reproduction system 10 including a command conversion device 14 according to a preferred embodiment of the present invention. The content reproduction system 10 includes an amplifier device 11, one or more content reproduction devices 12 (e.g., a CD player 12A, an MD recorder 12B, etc.), a content reproduction device 13 (e.g., a portable hard disk (HDD) player; hereinafter referred to as a "portable player"), and the command conversion device 14. The amplifier device 11 and the content reproduction devices 12 or 13 can be controlled from each other.

The content reproduction device 12 reproduces a content item (e.g., audio data) and sends the reproduced signal to the amplifier device 11. The portable player 13 reproduces a content item (e.g., audio data) and sends the reproduced signal to the amplifier device 11 via the command conversion device 14. The amplifier device 11 selectively amplifies one of the audio signal from the content reproduction device 12 and the audio signal from the portable player 13, and outputs the amplified audio signal as sound via a speaker (not shown). The content reproduction device 12 is connected to the amplifier device 11 via a communications cable. The portable player 13 is connected to the command conversion device 14, and the command conversion device 14 is connected to the amplifier device 11 via a communications cable. The content reproduction device 12 exchanges first commands with the amplifier device 11 via a communications cable. A "command" as used herein refers to an instruction for controlling a recipient device or a notification of the operation status of the sender device, which when received by the recipient device triggers the recipient device to perform a predetermined operation. A first command is a command with which the amplifier device 11 and another device connected thereto can be controlled from each other. The command conversion device 14 converts a first command received from the amplifier device 11 into a second command, and sends the second command to the portable player 13. Moreover, the command conversion device 14 converts a second command received from the portable player 13 into a first command, and sends the first command to the amplifier device 11. A second command is exclusively for use with a portable player, and is a command with which the amplifier device 11 and other devices connected thereto cannot be controlled from each other.

Since different content reproduction devices 12 are connected to the amplifier device 11, the amplifier device 11 receives/sends a different type of first commands for each of the content reproduction devices. The "type" as used herein represents the type of the content reproduction device to be connected to the amplifier device 11, and may be, for example, a CD player, an MD recorder, a tape recorder, a DVD player, etc. The content reproduction device 12 performs an operation based on a received first command, when it receives a first command corresponding to the type of device of itself from the amplifier device 11. Conversely, the content reproduction device 12 sends a first command corresponding to the device type of itself to the amplifier device 11, which can then determine the type of the received first command to thereby determine from which content reproduction device 12 the first command has been received. The amplifier device 11 can also send a type of a first command that is common to different types of content reproduction devices for specifying an operation of the system as a whole. The operation based on a first command of this type is performed by all the content reproduction devices 12 receiving the first command.

Figure 2:
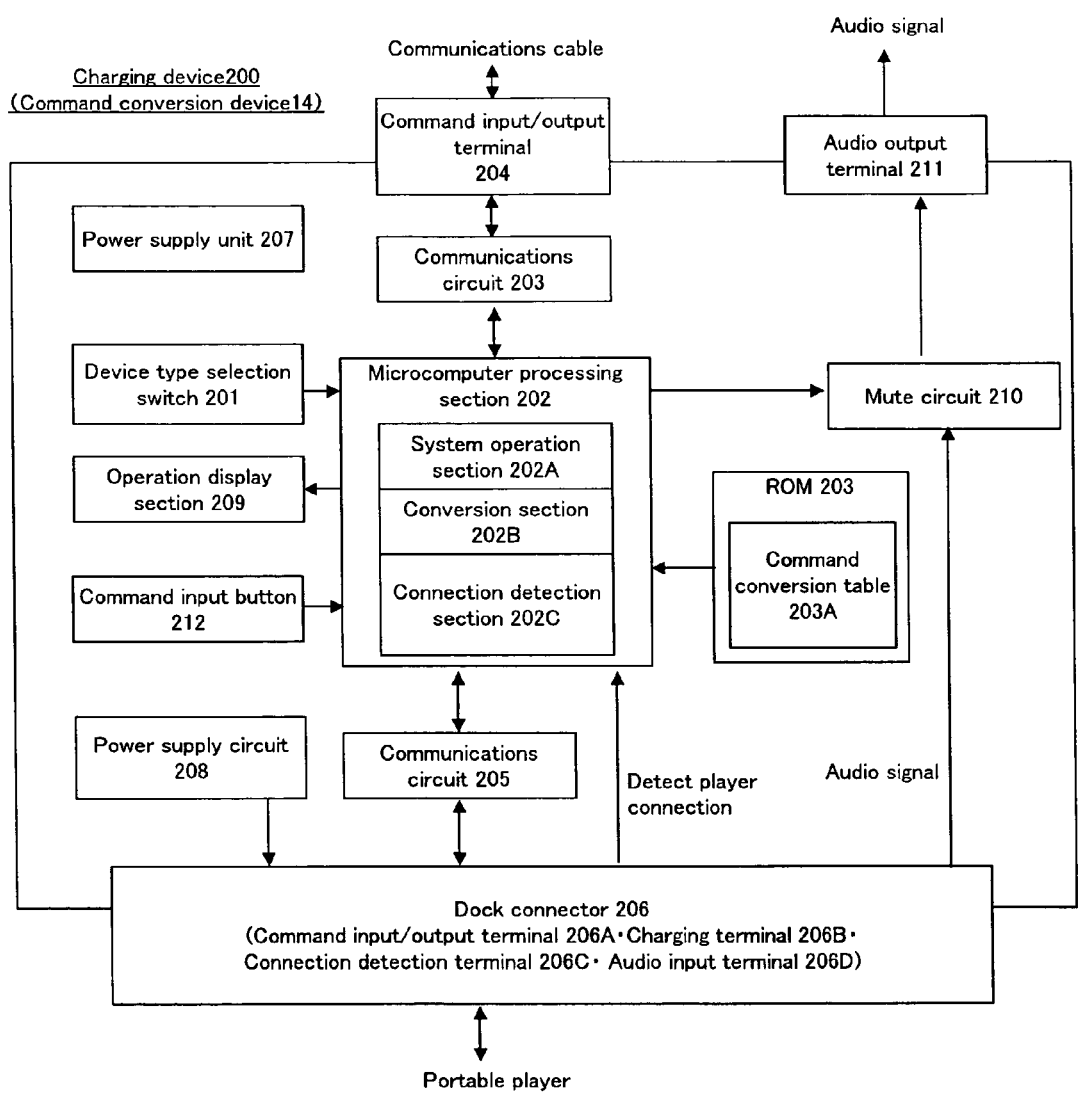
FIG. 2 is a schematic diagram showing a configuration of a charging device 200 (a command conversion device 14).

As shown in FIG. 2, the command conversion device 14 is provided in a charging device 200 for supplying a power supply voltage to the portable player 13. However, the present invention is no limited thereto, and the command conversion device 14 may alternatively be provided in other devices or in the portable player 13. The command conversion device 14 includes a selector (including a device type selection switch 201, etc.) and a converter (including a conversion section 202B, a command conversion table 203A, a communications circuit 203, 205, etc.).

The selector selects the type of first commands to be exchanged with the amplifier device 11. Specifically, the selector selects one of a plurality of types of first commands based on which the portable player 13 performs an operation. In other words, the selector determines as what type of a content reproduction device the amplifier device 11 recognizes the portable player 13.

Figure 3A:
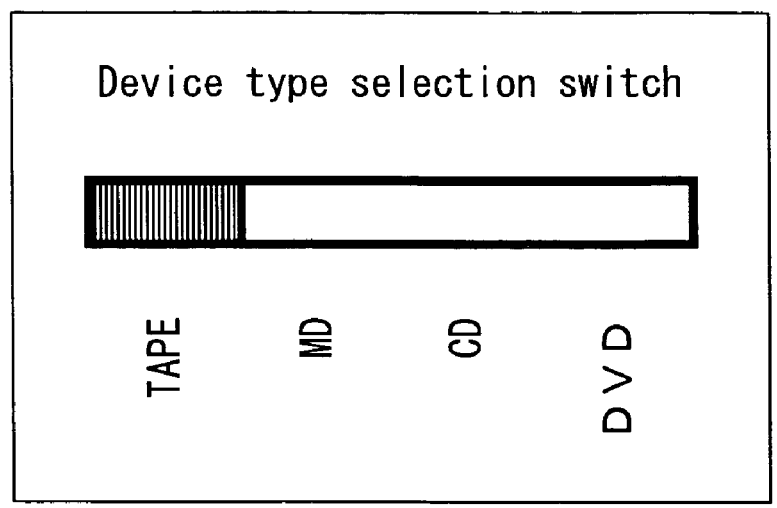
FIGS. 3A and 3B are schematic diagrams showing a configuration of a device type selection switch 201.
Figure 3B:
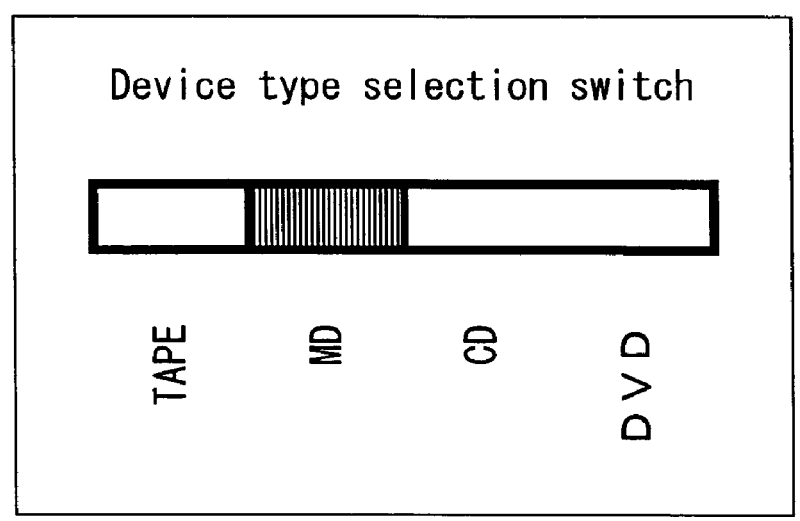

The selector includes the device type selection switch 201. The device type selection switch 201 includes a slider knob as shown in FIGS. 3A and 3B, for example. FIG. 3A shows a case where "tape recorder" is selected as the device type. In such a case, the portable player 13 performs an operation when a first command compatible with a tape recorder (e.g., a command to reproduce with a tape recorder) is sent from the amplifier device 11. Thus, in the state as shown in FIG. 3A, the operator can operate the portable player 13 by inputting a command to operate a tape recorder by operating a remote controller. FIG. 3B shows a case where "MD recorder" is selected as the device type.

When a first command compatible with the device type selected by the selector is received, the converter converts the received first command into a second command for the portable player 13 and sends the second command to the portable player 13. As used herein, first commands compatible with the device type selected by the selector include those that are common to all device types for specifying an operation of the system as a whole, in addition to those for the selected device. When the converter receives a second command from the portable player 13, the converter converts the second command into a corresponding first command of the selected type and sends the first command to the amplifier device 11.

The converter includes the conversion section 202B in a microcomputer processing section 202, the command conversion table 203A in a ROM 203 (which may be provided inside the microcomputer processing section 202), the communications circuit 203 and a command input/output terminal 204 for exchanging first commands with the amplifier device 11, and the communications circuit 205 and a command input/output terminal 206A (in a dock connector 206) for exchanging second commands with the portable player 13. The conversion section 202B determines whether or not the type of the first command received from the amplifier device 11 corresponds to the device type selected by the device type selection switch 201. If so, the conversion section 202B converts the first command into a command compatible with the portable player 13 based on the command conversion table 203A. FIGS. 4A and 4B each show a command conversion table. FIG. 4A is a table used when converting a first command received from the amplifier device 11 into a second command. The table contains first commands for different device types and second commands associated with the first commands. FIG. 4B is a table used when converting a second command received from the portable player 13 into a first command. The table contains second commands and first commands for different device types associated with the second commands.

Referring back to FIG. 2, the charging device 200 (the command conversion device 14) further includes the microcomputer processing section 202 (a system operation section 202A and a connection detection section 202C), the dock connector 206 (a charging terminal 206B, a connection detection terminal 206C and an audio input terminal 206D), a power supply unit 207, a power supply circuit 208, an operation display section 209, a mute circuit 210, and an audio output terminal 211. The system operation section 202A executes a program stored in the ROM 203 to thereby control the operation of the charging device 200 as a whole. When the connection detection terminal 206C is connected to the connection detection terminal of the portable player 13, the connection detection section (connection detector) 202C detects the connection between the portable player 13 and the charging device 200. The power supply circuit 208 supplies a power supply voltage to the portable player 13 via the charging terminal 206B. The audio input terminal 206D receives audio signal from the portable player 13. The audio output terminal 211 outputs audio signal from the audio input terminal 206D and the mute circuit 210 to the amplifier device 11. The power supply unit 207 receives a commercial AC (DC) power supply and supplies power supply voltages to various components of the charging device 200. The operation display section 209 turns ON an LED to indicate to the operator that a power supply voltage is being supplied to the charging device 200. Alternatively, the operation display section 209 indicates to the operator that the portable player 13 is in a ready state by the system operation. For example, the LED is turned ON when the charging device 200 sends the portable player 13 a second command (PowerOn) to turn the power ON or a second command to start reproducing a content item (Play) (i.e., when the power of the portable player is turned ON). The color in which the LED is lit may be varied depending on the identification information of the portable player 13 sent from the portable player 13 connected, e.g., the device type ID or the serial number. In such a case, the LED can be lit in red when a red-colored portable player is connected. The mute circuit 210 mutes the audio signal to be output to the amplifier device 11 as necessary. The charging device 200 (the command conversion device 14) has a function of converting a special audio signal output terminal of the portable player 13 into an ordinary audio output terminal corresponding to an ordinary audio input terminal of the amplifier device 11.

Figure 5:
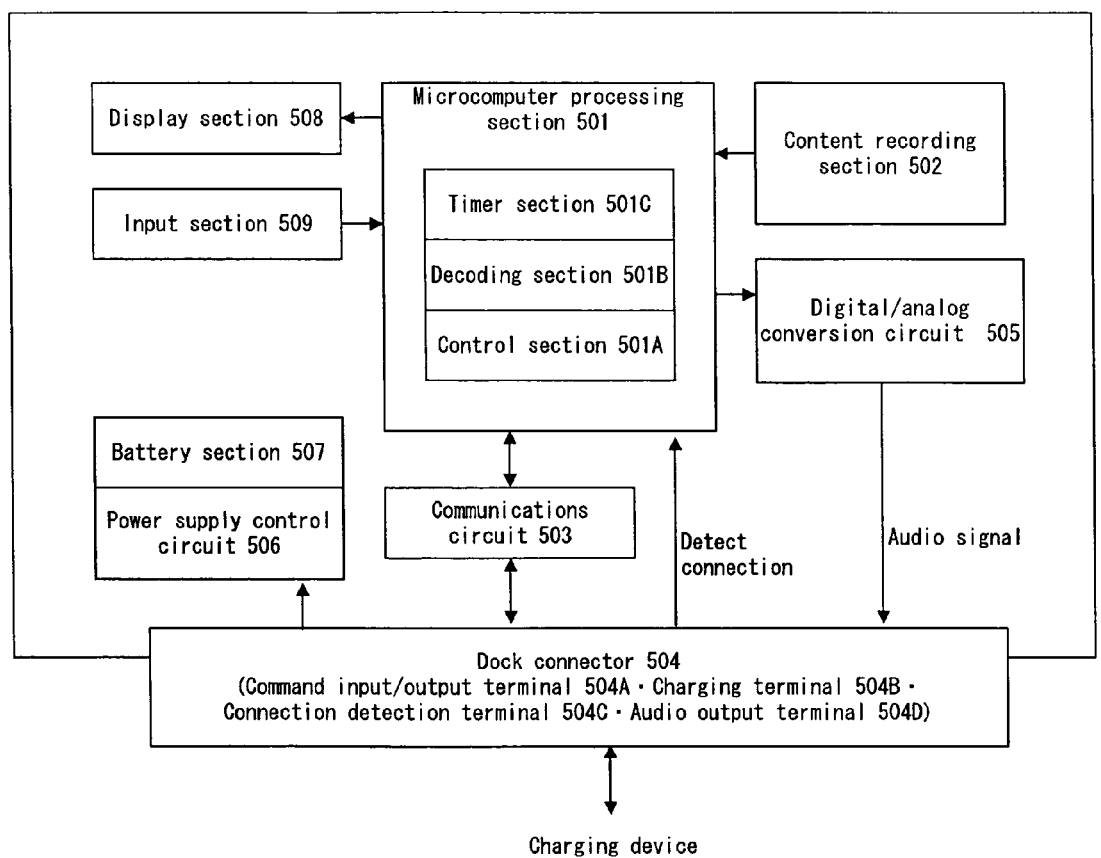
FIG. 5 is a schematic diagram showing a configuration of a portable player 13.

FIG. 5 is a schematic diagram showing a configuration of the portable player 13. The portable player 13 includes a microcomputer processing section 501, a content recording section 502, a communications circuit 503, a dock connector 504, a digital/analog conversion circuit 505, a power supply control circuit 506, a battery section 507, a display section 508, and an input section 509. The microcomputer processing section 501 includes a control section 501A, a decoding section 501B, and a timer section 501C. The dock connector 504 includes a command input/output terminal 504A, a charging terminal 504B, a connection detection terminal 504C, and an audio output terminal 504D.

The control section 501A controls the operation of various components based on a second command received from the command conversion device 14 via the command input/output terminal 504A and the communications circuit 503. The control section 501A sends a second command to the command conversion device 14 via the communications circuit 503 and the command input/output terminal 504A. The decoding section 501B decodes audio data from a content recording section (e.g., an HDD), and gives the decoded data to the digital/analog conversion circuit 505. The digital/analog conversion circuit 505 converts audio data from the decoding section 501B into an analog signal, and outputs the analog signal to the charging device 200 via the audio output terminal 504D. The timer section 501C keeps the time for a timer operation to be described later. The power supply control circuit 506 gives the power supply voltage supplied from the charging device 200 via the charging terminal 504B to the battery section 507, and supplies the power supply voltage charged in the battery section 507 to various components of the portable player 13. The display section 508 includes a liquid crystal display section, or the like, and visually indicates an operation status of the portable player 13, etc.

Figure 6:
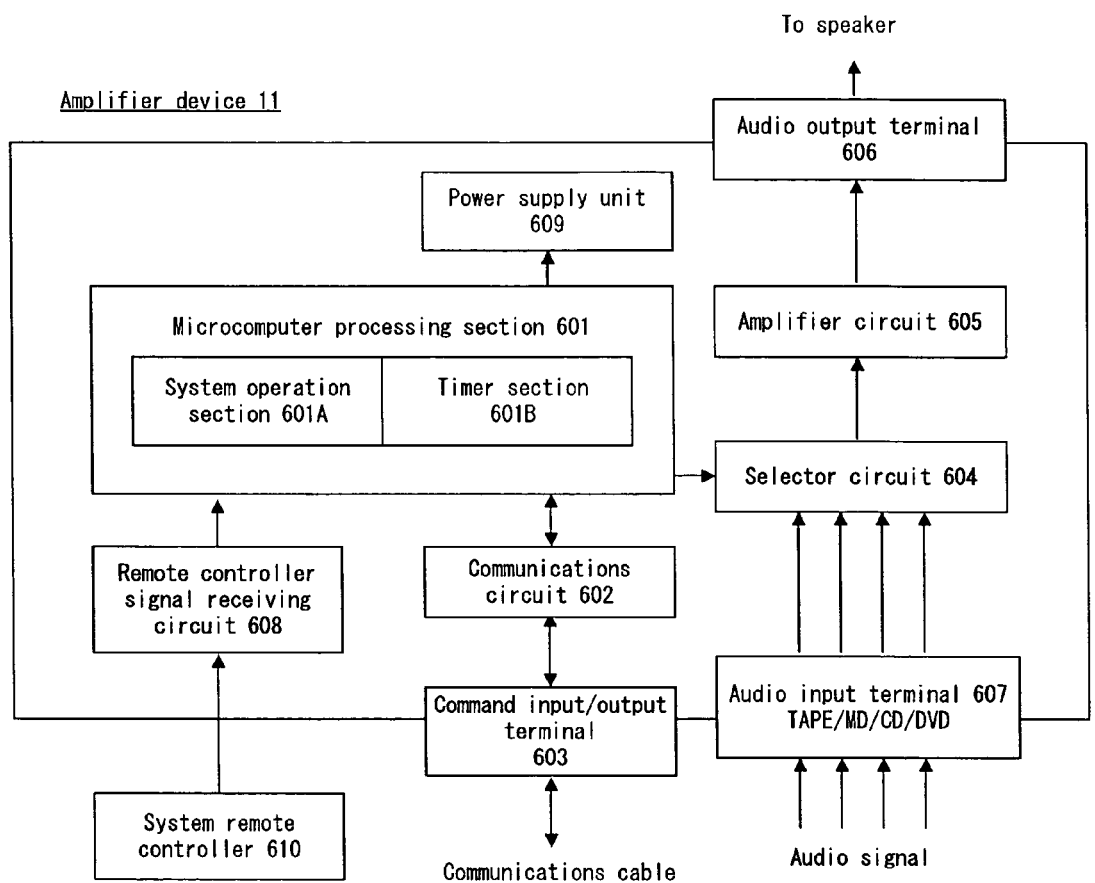
FIG. 6 is a schematic diagram showing a configuration of an amplifier device 11.

FIG. 6 is a schematic diagram showing a configuration of the amplifier device 11. The amplifier device 11 includes a microcomputer processing section 601, a communications circuit 602, a command input/output terminal 603, a selector circuit 604, an amplifier circuit 605, an audio output terminal 606, a plurality of audio input terminals 607, a remote controller signal receiving circuit 608, and a power supply unit 609. The microcomputer processing section 601 includes a system operation section 601A and a timer section 601B.

The remote controller signal receiving circuit 608 converts a remote controller signal (first command) received from a system remote controller 610 into an electric signal. The system operation section 601A sends the first command from the remote controller signal receiving circuit 608 to the command conversion device 14 via the communications circuit 602 and the command input/output terminal 603. Alternatively, the system operation section 601A may control various components based on the command from the remote controller signal receiving circuit 608, and then send a system first command common to all device types to the command conversion device 14. The system operation section 601A controls various components based on the first command received from the command conversion device 14 via the command input/output terminal 603 and the communications circuit 602. The timer section 601B keeps the time for a timer operation. The audio input terminal 607 is a terminal or a group of terminals to which a plurality of content reproduction devices 12 and the command conversion device 14 can be connected, as shown in FIG. 1, and receives audio signal from the content reproduction devices 12 and the command conversion device 14. The selector circuit 604 selects the audio signal to be input via the audio input terminal 607 and given to the amplifier circuit 605. The selected audio signal is amplified by the amplifier circuit 605, and output as sound via a speaker (not shown) via the audio output terminal 606.

Figure 7:
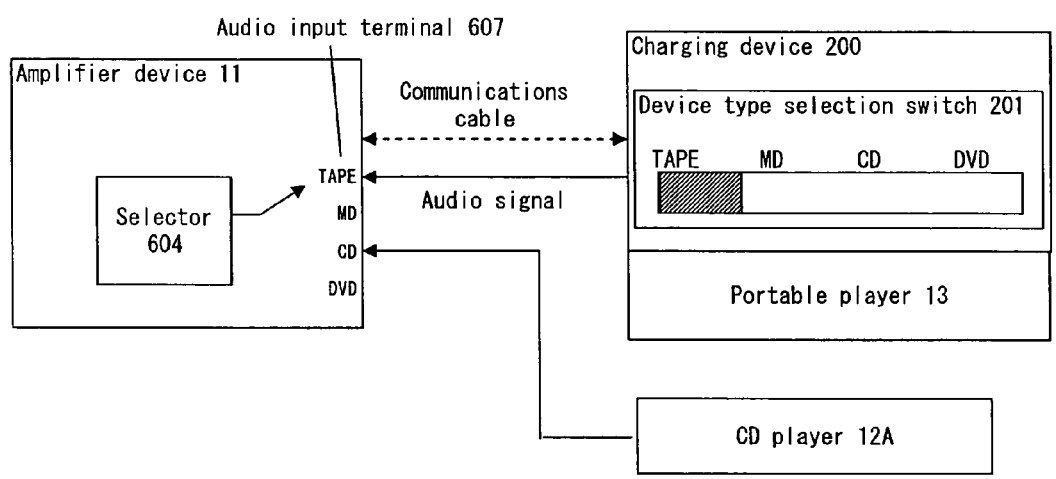
FIG. 7 is a schematic diagram showing how components are connected together in a content reproduction system.
Figure 8:
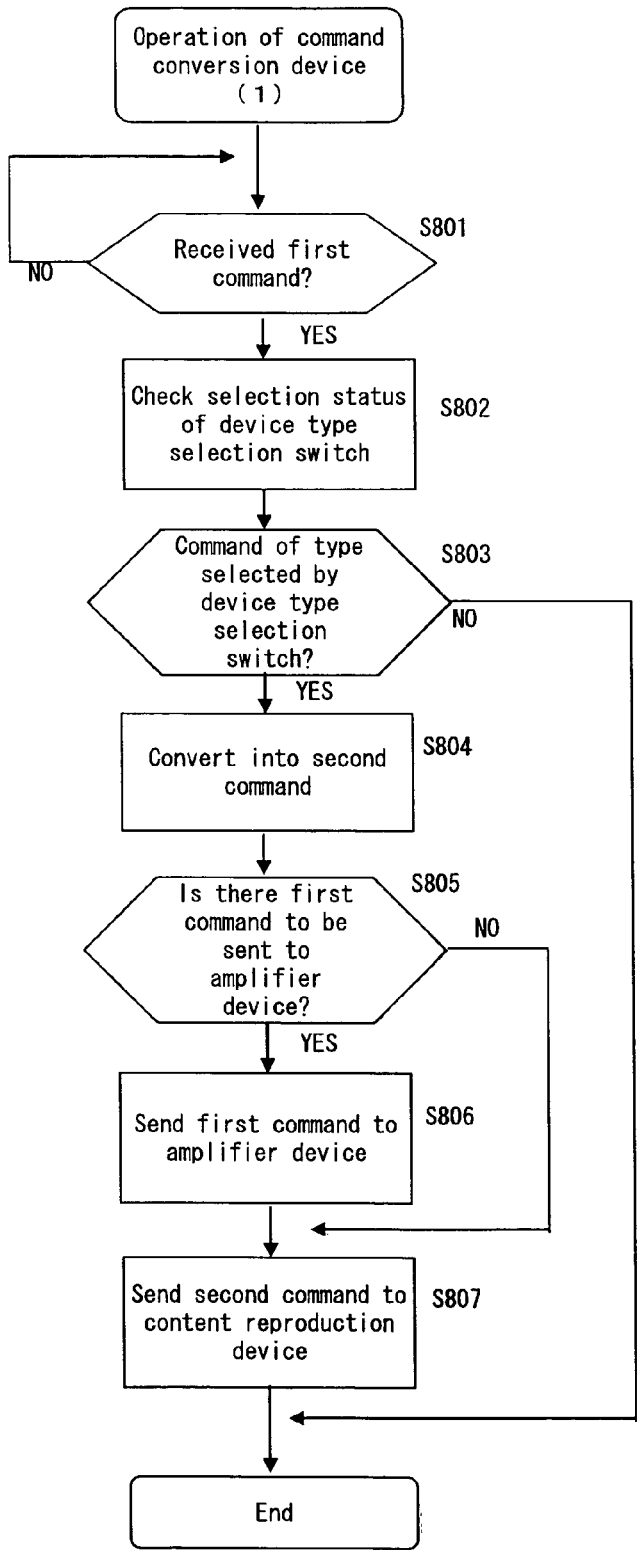
FIG. 8 is a flow chart showing an operation of the command conversion device 14.
Figure 9:
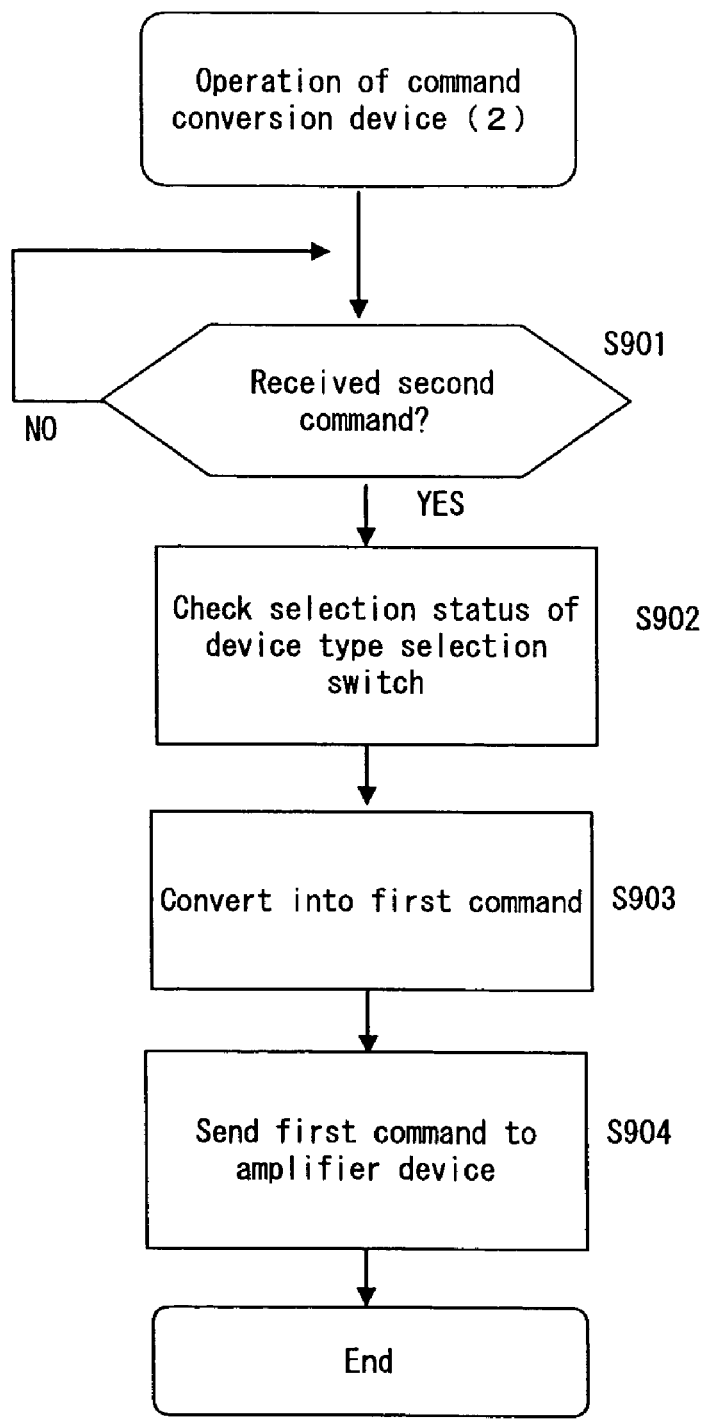
FIG. 9 is a flow chart showing an operation of the command conversion device 14.

An operation of the content reproduction system 10 having such a configuration will now be described with reference to FIGS. 7 to 9. Referring to FIG. 7, where the device type selection switch 201 selects "tape recorder", the audio output terminal 211 of the charging device 200 is connected to the "tape recorder" audio input terminal 607 of the amplifier device 11. Then, as will be described later, when a command to start reproducing a content item (Play) is sent from the portable player 13, the selector circuit 604 of the amplifier device 11 can automatically select the audio input terminal of the tape recorder. Now, a case where the device type selection switch 201 selects "tape recorder" will be described.

First, a case where the command conversion device 14 receives a first command from the amplifier device 11 will be described. Referring to FIG. 8, when the command conversion device 14 receives a first command from the amplifier device 11 (YES in S801), the command conversion device 14 checks the selection status of the device type selection switch 201, and determines whether or not the received first command is a command compatible with the device type selected by the device type selection switch 201 (S802, S803). In a case where a "tape recorder" first command is received when "tape recorder" is being selected by the device type selection switch 201 (YES in S803), the command conversion device 14 converts the received first command into a second command compatible with the portable player 13 based on the command conversion table 203A (S804). Then, the charging device 200 determines whether or not there is a first command that needs to be sent to the amplifier device 11 (S805). If so, the charging device 200 sends the first command to the amplifier device 11 (S806). Note that a first command that needs to be sent to the amplifier device 11 is, for example, a command (TAPE DCHG), etc., to be described later with reference to FIGS. 19 and 20. Then, the command conversion, device 14 sends the second command obtained through conversion based on the command conversion table to the portable player 13 (S807). In a case where the first command received in S803 is not compatible with the device type selected by the device type selection switch 201 (e.g., where an "MD recorder" first command is received while "tape recorder" is being selected by the device type selection switch 201), the process is terminated without sending the second command corresponding to the received first command to the portable player 13.

Next, a case where the command conversion device 14 receives a second command from the portable player 13 will be described. Referring to FIG. 9, when the command conversion device 14 receives a second command from the portable player 13 (YES in S901), the command conversion device 14 checks the selection status of the device type selection switch 201 (S902), and converts the second command into a first command of the device type selected by the device type selection switch 201 based on the command conversion table 203A (S903). In the illustrated example, "tape recorder" is being selected by the device type selection switch 201, and the second command is therefore converted into a "tape recorder" first command. Then, the command conversion device 14 sends the first command to the amplifier device 11 (S904).

As described above, the charging device 200 (the command conversion device 14) converts a command compatible with the amplifier device 11 (first command) and a command compatible with the portable player 13 (second command) into each other. Therefore, a portable player that is not compatible with commands used with the amplifier device 11 can be operated by commands from the amplifier device 11. Moreover, the amplifier device 11 can be controlled by a command that is exclusively for use with the portable player 13.

Now, a specific example of an operation of the content reproduction system 10 will be described.

[SYSTEM_ON Operation]

Figure 10:
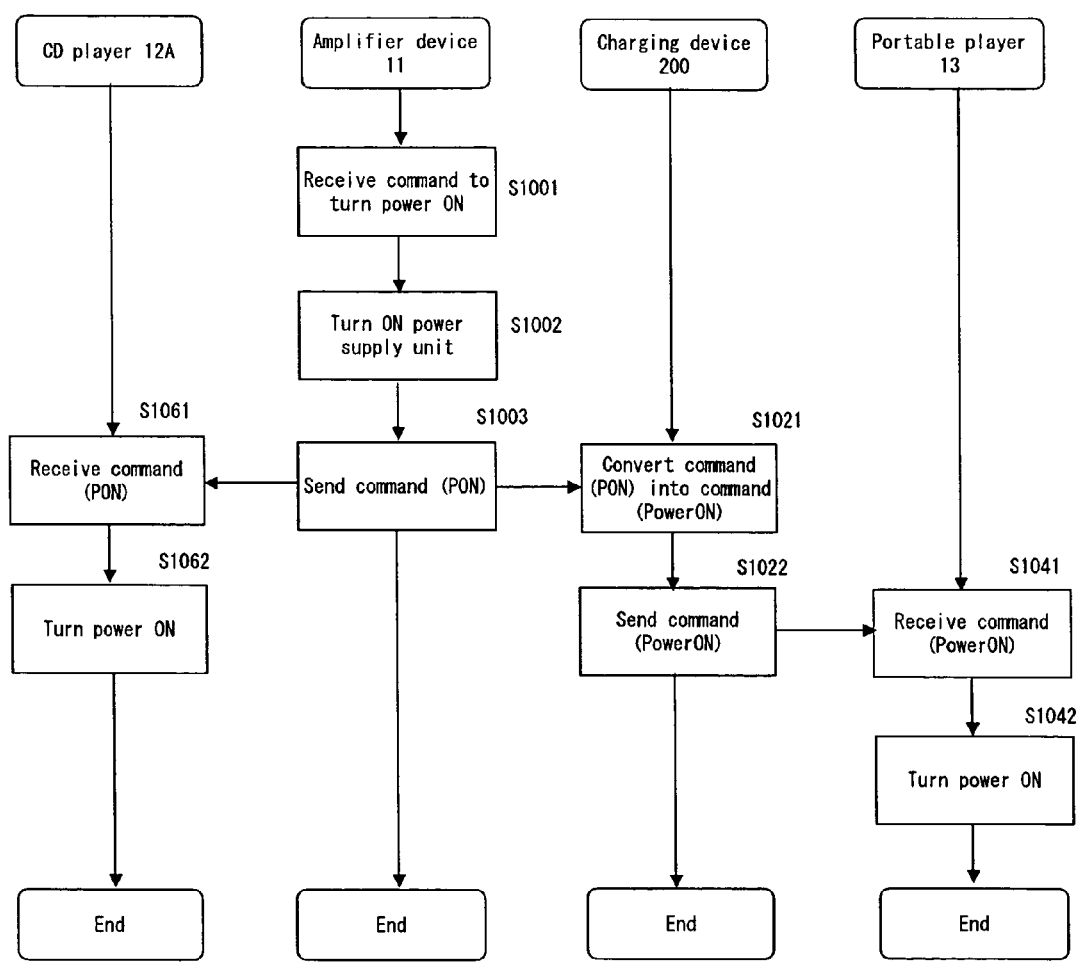
FIG. 10 is a flow chart showing a SYSTEM_ON operation.

In this example, as the power of the amplifier device 11 is turned ON, the power of the portable player is automatically turned ON. Referring to FIG. 10, when the operator using a remote controller inputs to the amplifier device 11 a command to turn ON the power of the amplifier device 11, the system operation section 601A receives the command (S1001) and turns ON the power supply unit 609 (S1002). The system operation section 601A sends the charging device 200 and the CD player 12A a first command (PON) to turn the power ON (S1003). Since the command (PON) is a system command common to the various device types, all the devices connected to the amplifier device 11 via a communications cable are turned ON upon receipt of the command. When the charging device 200 receives the first command (PON), the conversion section 202B converts the first command (PON) into a second command (PowerON) compatible with the portable player 13 based on the command conversion table 203A of FIG. 4A (S1021), and sends the second command to the portable player 13 (S1022). The portable player 13 receives the second command (PowerON) from the charging device 200 (S1041), and turns the power ON (S1042). The CD player 12A also receives the first command (PON) (S1061), and turns the power ON (S1062).

[SYSTEM_OFF Operation]

Figure 11:
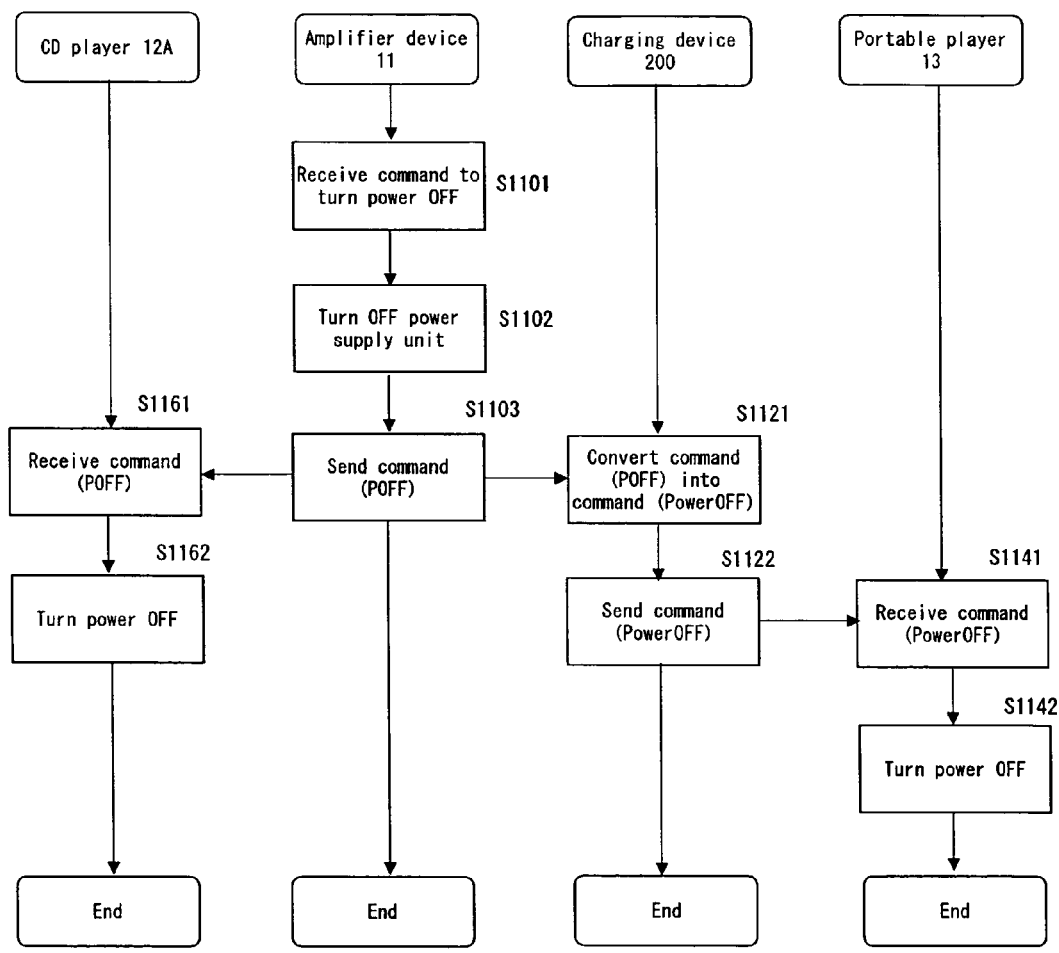
FIG. 11 is a flow chart showing a SYSTEM_OFF operation.

In this example, as the power of the amplifier device 11 is turned OFF, the power of the portable player 13 is automatically turned OFF. Referring to FIG. 11, when the operator using a remote controller inputs to the amplifier device 11 a command to turn OFF the power of the amplifier device 11, the system operation section 601A receives the command (S1101) and turns OFF the power supply unit 609 (i.e., brings the power supply unit to a standby state where power is supplied only to the microcomputer processing section 202; the definition is true throughout the present specification) (S1102). The system operation section 601A sends a first command (POFF) to turn the power OFF to the charging device 200 and the CD player 12A (S1103). Since the command (POFF) is a system command common to the various device types, all the devices connected to the amplifier device 11 via a communications cable are turned OFF upon receipt of the command. When the charging device 200 receives the first command (POFF), the conversion section 202B converts the first command (POFF) into a second command (PowerOFF) based on the command conversion table 203A (S1121), and sends the second command to the portable player 13 (S1122). The portable player 13 receives the second command (PowerOFF) from the charging device 200 (S1141), and turns the power OFF (S1142). The CD player 12A also receives the first command (POFF) (S1161), and turns the power OFF (S1162).

[SYSTEM_TIMER_ON Operation]

Figure 12:
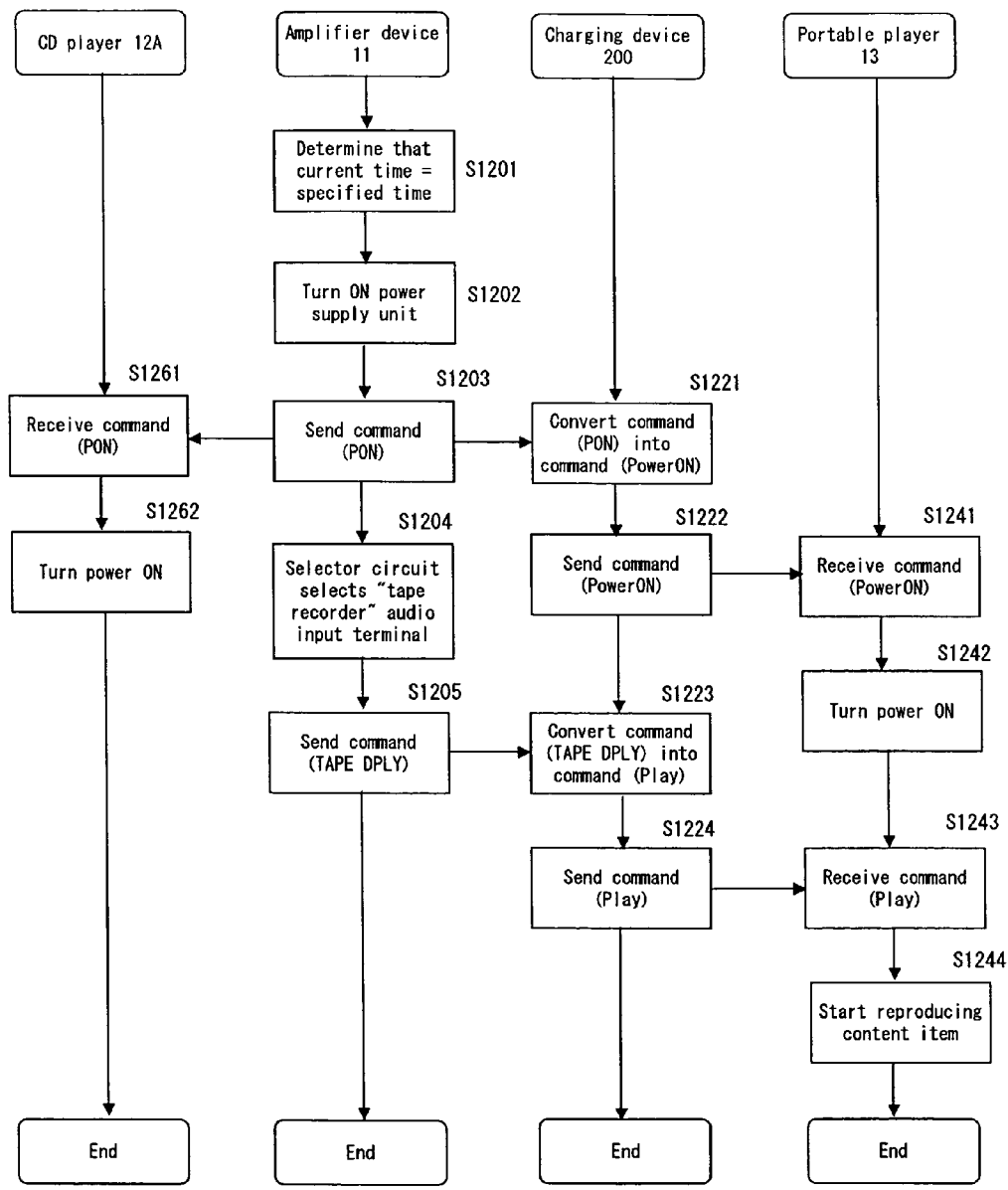
FIG. 12 is a flow chart showing a SYSTEM_TIMER_ON operation.

In this example, the operator programs the amplifier device 11 to trigger a tape recorder to start reproducing a content item at a specified time. At the specified time, the power of the amplifier device 11 is turned ON, which turns ON the power of the portable player 13, and the reproduction of a content item starts. Referring to FIG. 12, when the timer section 601B of the amplifier device 11 determines that the current time is equal to the time specified by the operator (S1201), the system operation section 601A turns ON the power supply unit 609 (S1202). The amplifier device 11 sends a first command (PON) to the charging device 200 and the CD player 12A (S1203). When the charging device 200 receives the first command (PON) from the amplifier device 11, the charging device 200 converts the first command into a second command (PowerON) (S1221), and sends the second command to the portable player 13 (S1222). The portable player 13 receives the second command (PowerON) (S1241), and turns the power ON (S1242). Then, the system operation section 601A of the amplifier device 11 controls the selector circuit 604 to select the "tape recorder" audio input terminal (S1204). The system operation section 601A sends a first command (TAPE DPLY) to start reproducing a content item (direct play) by the tape recorder (S1205). When the charging device 200 receives the first command (TAPE DPLY), the charging device 200 converts the first command into a second command (Play) (S1223), and sends the second command to the portable player 13 (S1224). When the portable player 13 receives the second command (Play) (S1243), the portable player 13 starts reproducing a content item (S1244).

[SYSTEM_TIMER_OFF Operation]

The amplifier device 11 turns OFF the power of the entire system at a time specified by the operator. The specific operation is similar to that shown in FIG. 11, except that the system operation section 601A turns OFF the power of the entire system when the timer section 601B determines that the current time is equal to the time specified by the operator, instead of when the operator using a remote controller inputs a command to turn OFF the power.

[DIRECT_PLAY Operation]

Figure 13:
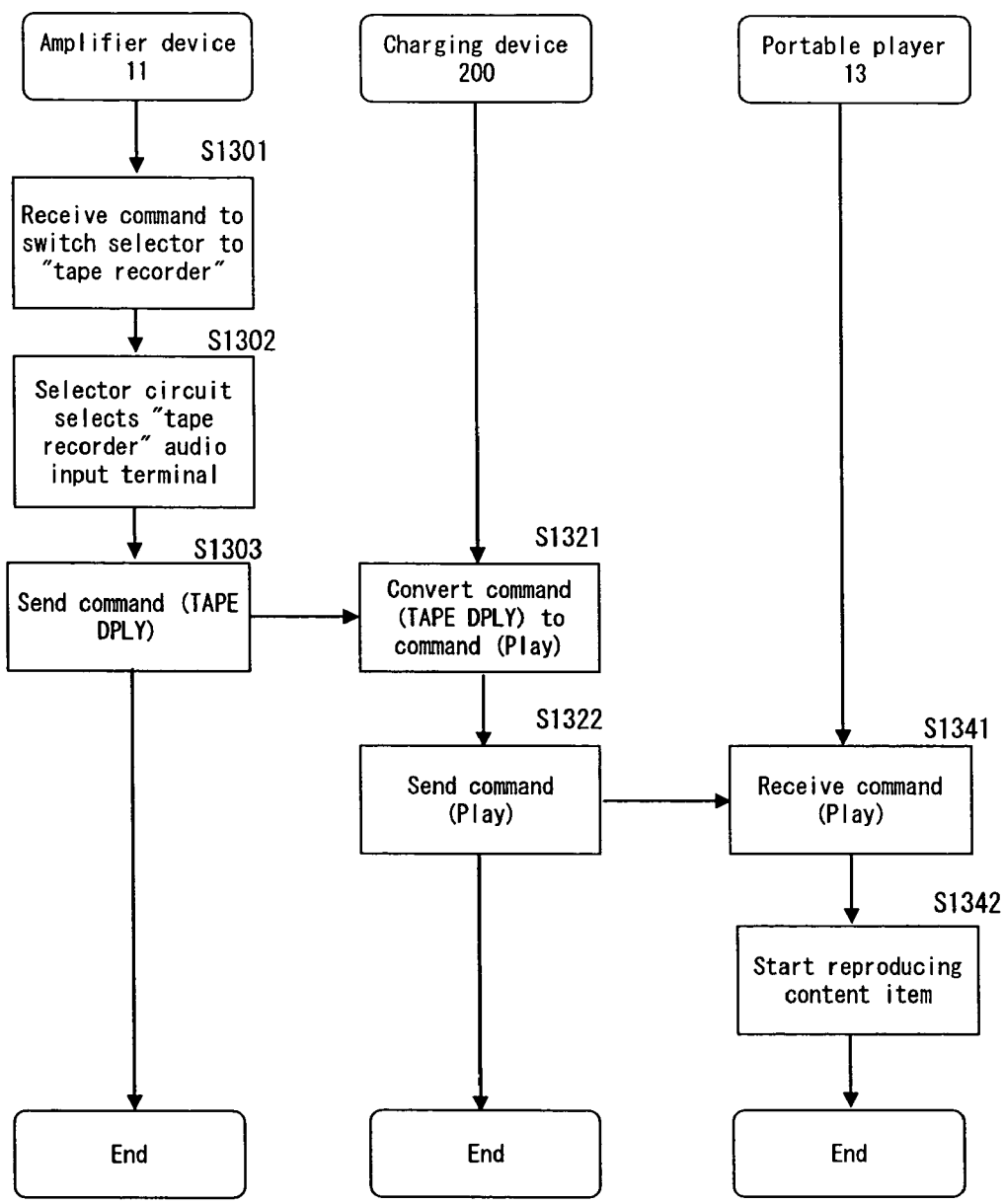
FIG. 13 is a flow chart showing a DIRECT_PLAY operation.

In this example, when the selector circuit of the amplifier device 11 selects a "tape recorder" audio input terminal, the portable player 13 automatically starts reproducing a content item. Referring to FIG. 13, when the operator using a remote controller inputs a command to control the selector circuit 604 to select the "tape recorder" audio input terminal (S1301), the selector circuit 604 selects the "tape recorder" audio input terminal (S1302). The system operation section 601A sends a first command (TAPE DPLY) to start reproducing a content item (direct play) by the tape recorder (S1303). When the charging device 200 receives the first command (TAPE DPLY), the charging device 200 converts the first command into a second command (Play) (S1321), and sends the second command to the portable player 13 (S1322). The portable player 13 receives the second command (Play) (S1341), and starts reproducing a content item (S1342).

[AUTO_POWER_ON Operation]

Figure 14:
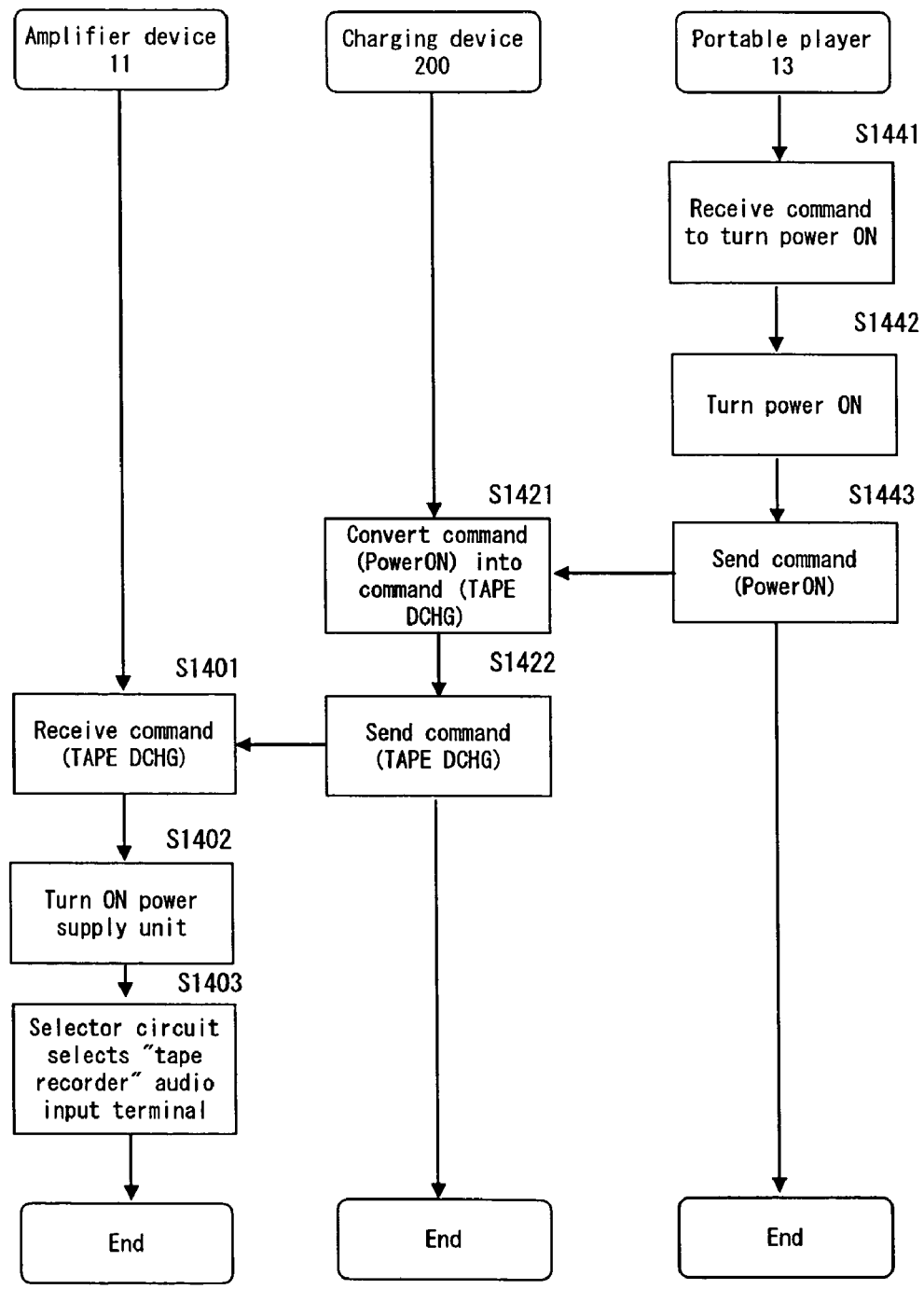
FIG. 14 is a flow chart showing an AUTO_POWER_ON operation.

In this example, when the power of the portable player 13 is turned ON, the power of the amplifier device 11 is automatically turned ON and controls the selector circuit to select the "tape recorder" audio input terminal. Referring to FIG. 14, when the operator operates the power button on the portable player 13, the portable player 13 receives a command to turn the power ON (S1441), and turns the power ON (S1442). The control section 501A of the portable player 13 sends a second command indicating that the power of the portable player 13 is ON (PowerON) to the charging device 200 (S1443). When the charging device 200 receives the second command (PowerON), the charging device 200 converts the second command into a first command (TAPE DCHG) compatible with a tape recorder based on the command conversion table of FIG. 4B and the selection status of the device type selection switch 201 (S1421), and sends the first command to the amplifier device 11 (S1422). When the amplifier device 11 receives the first command (TAPE DCHG) (S1401), the system operation section 601A turns ON the power supply unit 609 (S1402), and controls the selector circuit 604 to select the "tape recorder" audio input terminal (corresponding to the device type selected by the device type selection switch 201) (S1403).

[DIRECT_CHANGE Operation]

Figure 15:
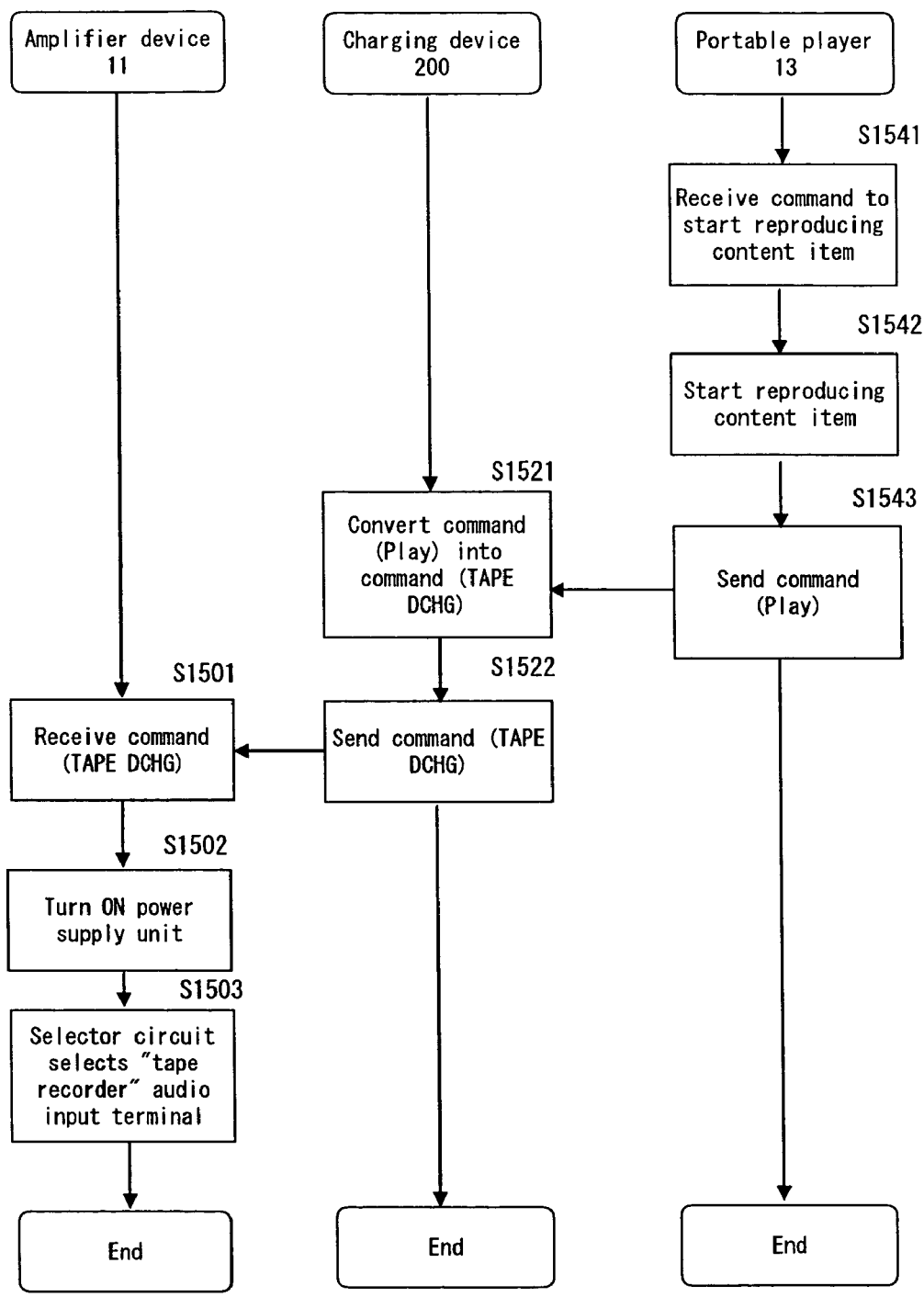
FIG. 15 is a flow chart showing a DIRECT_CHANGE operation.

In this example, when the portable player 13 is triggered to start reproducing a content item, the power of the amplifier device 11 is automatically turned ON, and the selector circuit is automatically controlled to select the "tape recorder" audio input terminal. Referring to FIG. 15, when the operator operates an operation button on the portable player 13, the portable player 13 receives a command to start reproducing a content item (S1541), and starts reproducing a content item (S1542). The portable player 13 sends the charging device 200 a second command (Play) indicating that the portable player 13 has started reproducing a content item (S1543). When the charging device 200 receives the second command (Play), the charging device 200 converts the second command into a first command (TAPE DHCG) compatible with a tape recorder based on the command conversion table and the selection status of the device type selection switch 201 (S1521), and sends the first command to the amplifier device 11 (S1522). When the amplifier device 11 receives the first command (TAPE DHCG) (S1501), the amplifier device 11 turns the power ON if the power is OFF (S1502), and controls the selector circuit 604 to select the "tape recorder" audio input terminal (S1503). Although the present invention is not limited to this, when the portable player 13 is triggered to start reproducing a content item, the portable player 13 sends a command indicating that the reproduction of a content item has been started in order to turn ON the power of the FM (RF) transmitter, which is one of its subsidiary components. Therefore, in this example, the command to turn ON the power of the FM transmitter can be used as the command (Play).

[TIMER_ON Operation by Portable Player]

Figure 16:
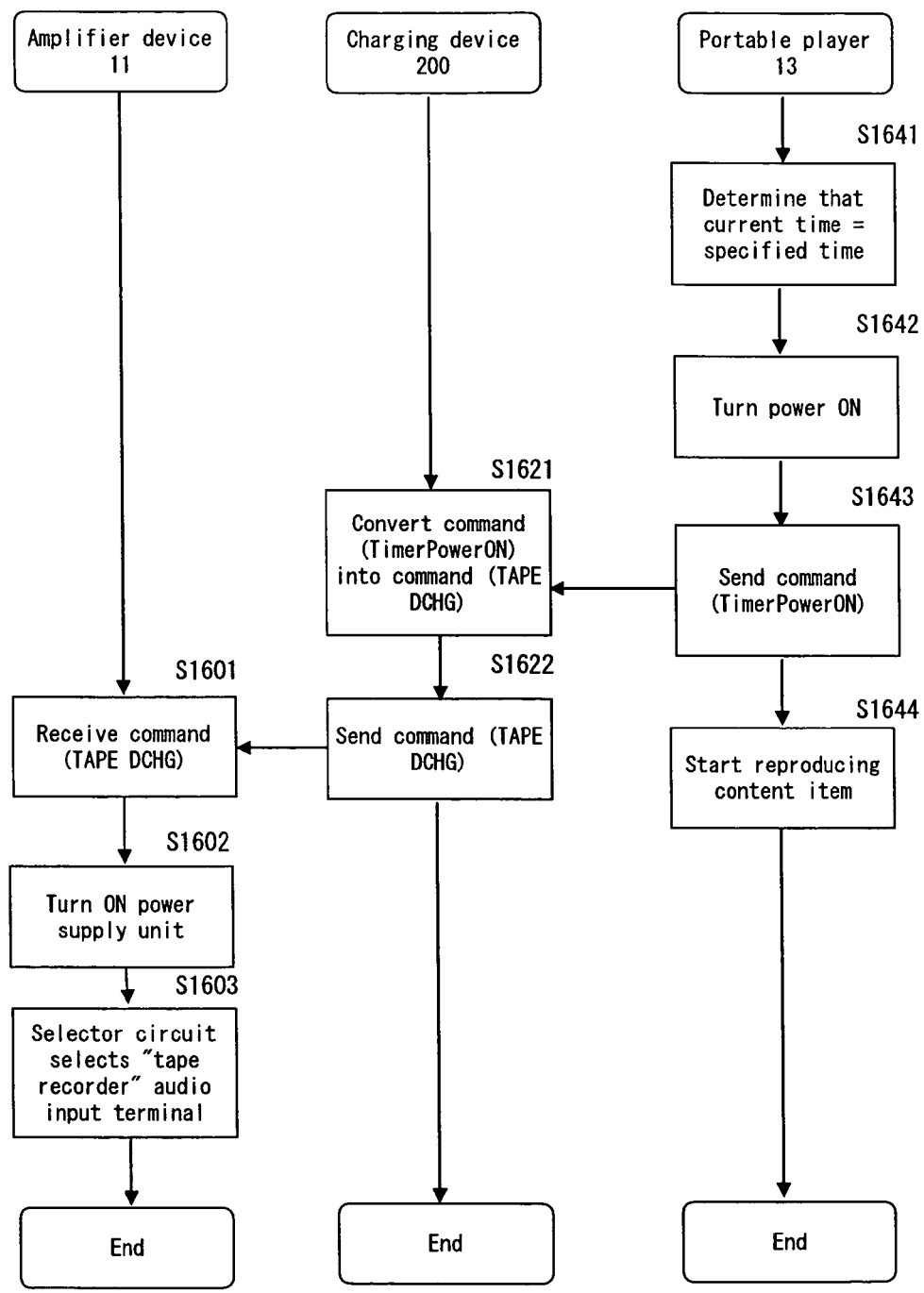
FIG. 16 is a flow chart showing a TIMER_ON operation.

In this example, when the portable player 13 is triggered to start reproducing a content item by a timer operation, the power of the amplifier device 11 is automatically turned ON and the selector circuit is automatically controlled to select the "tape recorder" audio input terminal. Referring to FIG. 16, when the timer section 501C determines that the current time is equal to the time specified by the operator (S1641), the portable player 13 turns the power ON (S1642). The portable player 13 sends the charging device 200 a second command (TimerPowerOn) indicating that the power of the portable player 13 has been turned ON by a timer operation (S1643). Then, the portable player 13 starts reproducing a content item (S1644). When the command conversion device 14 receives the second command (TimerPowerOn), the command conversion device 14 converts the second command into a first command (TAPE DCHG) compatible with a tape recorder based on the command conversion table and the selection status of the device type selection switch 201 (S1621), and sends the first command to the amplifier device 11 (S1622). When the amplifier device 11 receives the first command (TAPE DCHG) (S1601), the amplifier device 11 turns the power ON if the power is OFF (S1602), and controls the selector circuit 604 to select the "tape recorder" audio input terminal (S1603).

[TIMER_OFF Operation by Portable Player]

Figure 17:
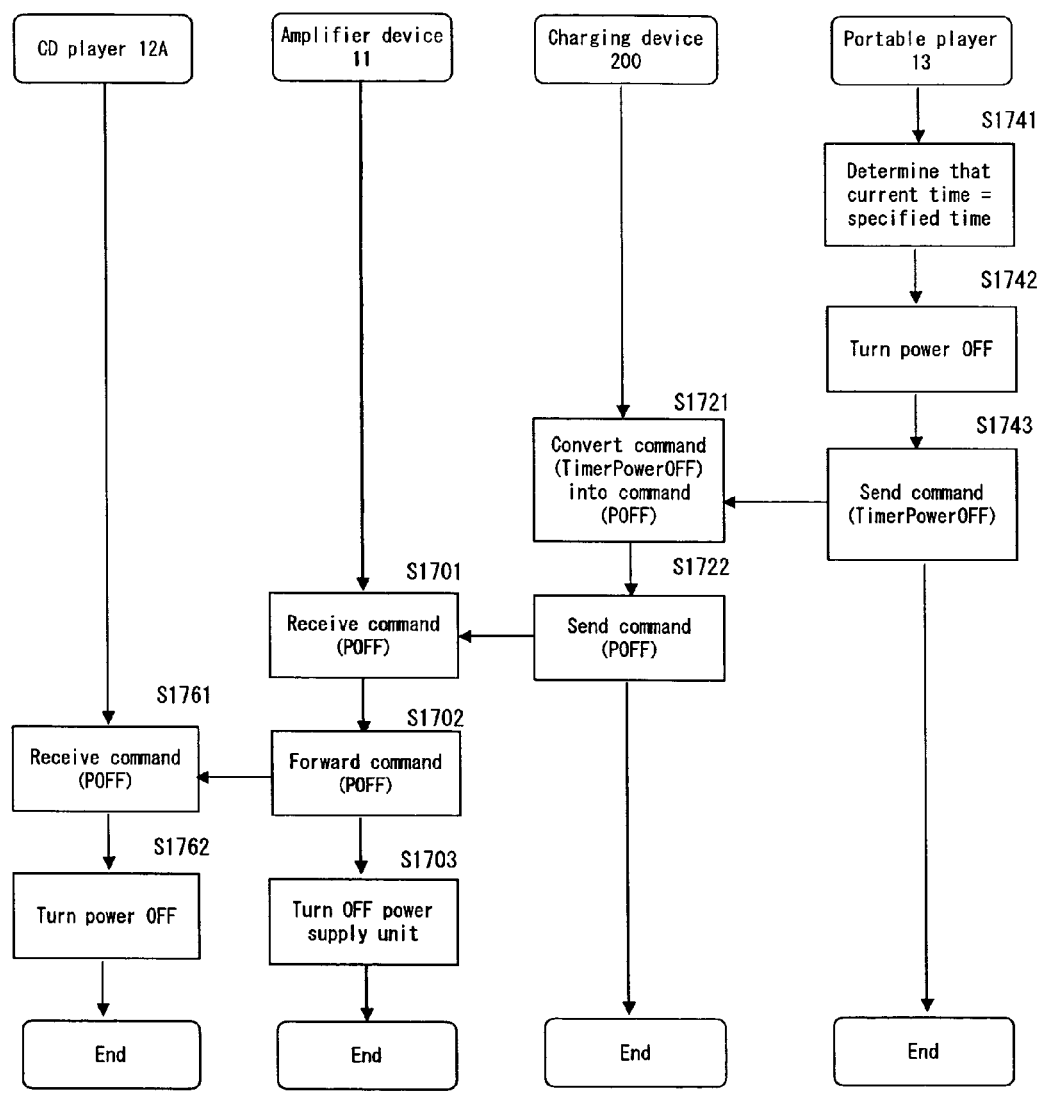
FIG. 17 is a flow chart showing a TIMER_OFF operation.

In this example, when the power of the portable player 13 is turned OFF by a timer operation, the power of the amplifier device 11 and the power of the CD player are automatically turned OFF. Referring to FIG. 17, when the timer section 501C determines that the current time is equal to the time specified by the operator (S1741), the portable player 13 turns the power OFF (S1742). The portable player 13 sends the charging device 200 a second command (TimerPowerOff) indicating that the power of the portable player 13 has been turned OFF by a timer operation (S1743). When the charging device 200 receives the second command (TimerPowerOff) (S1721), the charging device 200 converts the second command into a first command (POFF) to turn the power OFF (S1721), and sends the first command to the amplifier device 11 (S1722). When the amplifier device 11 receives the first command (POFF) (S1701), the amplifier device 11 forwards the first command (POFF) to the CD player 12A (S1702) and turns OFF the power supply unit 609 (S1703). When the CD player 12A receives the first command (POFF) (S1761), the CD player 12A turns the power OFF (S1762).

[CONNECT Operation]

Figure 18:
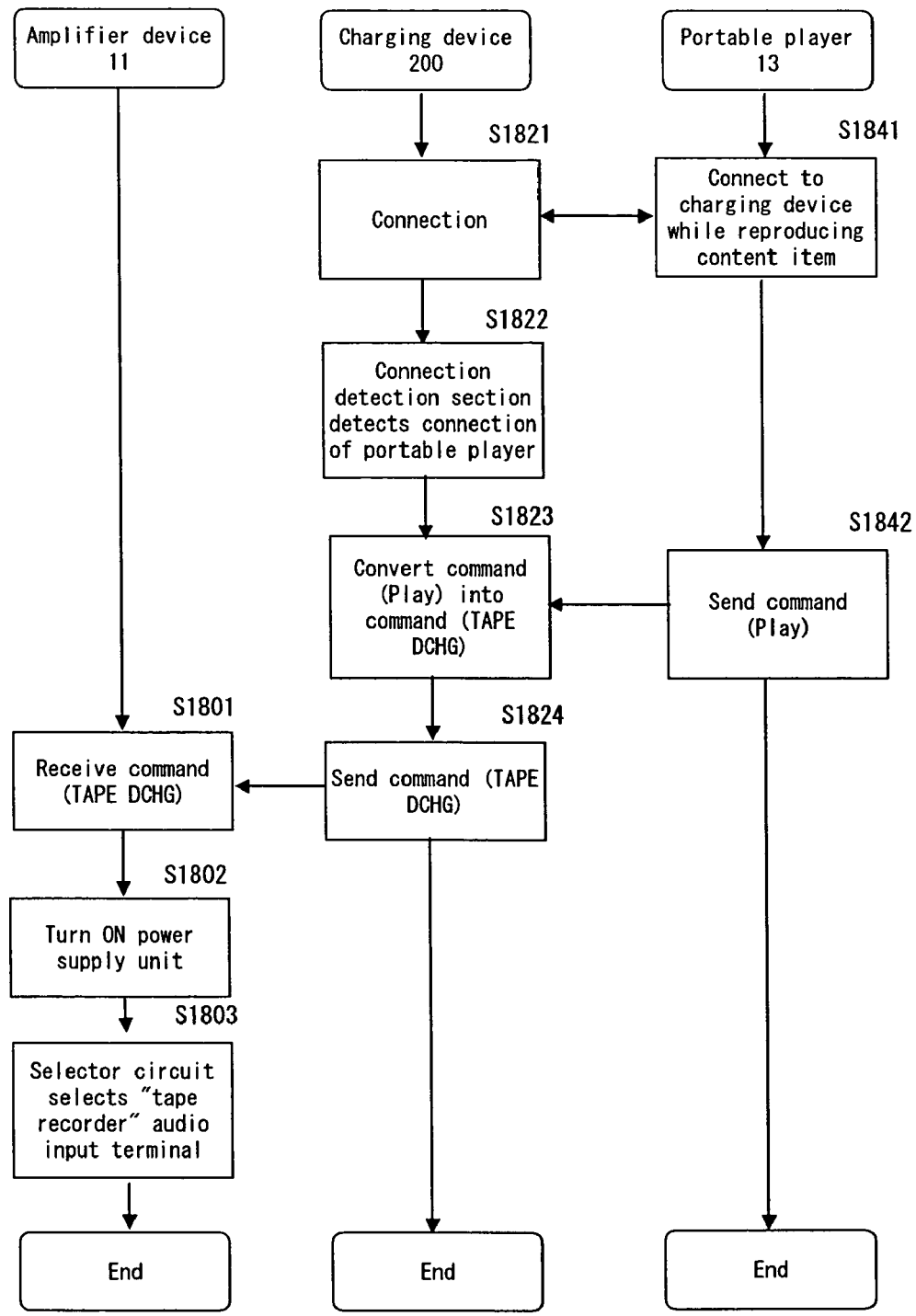
FIG. 18 is a flow chart showing a CONNECT operation.

In this example, when the portable player 13 is connected to the charging device 200 during a reproduction operation, the power of the amplifier device 11 is automatically turned ON and the selector circuit is automatically controlled to select the "tape recorder" audio input terminal. Referring to FIG. 18, when the portable player 13 is connected to the charging device 200 during a reproduction operation (S1821, S1841), the portable player 13 sends the charging device 200 a second command (Play) indicating that the portable player 13 has started reproducing a content item (S1842). When the connection detection section 202C detects the connection with the portable player 13 (S1822) and the charging device 200 receives the second command (Play), the charging device 200 converts the second command into a first command (TAPE DCHG) compatible with a tape recorder based on the command conversion table and the selection status of the device type selection switch 201 (S1823), and sends the first command to the amplifier device 11 (S1824). When the amplifier device 11 receives the first command (TAPE DCHG) (S1801), the amplifier device 11 turns ON the power supply unit 609 (S1802) and controls the selector circuit 604 to select the "tape recorder" audio input terminal (S1803).

[POWER_ON Operation]

Figure 19:
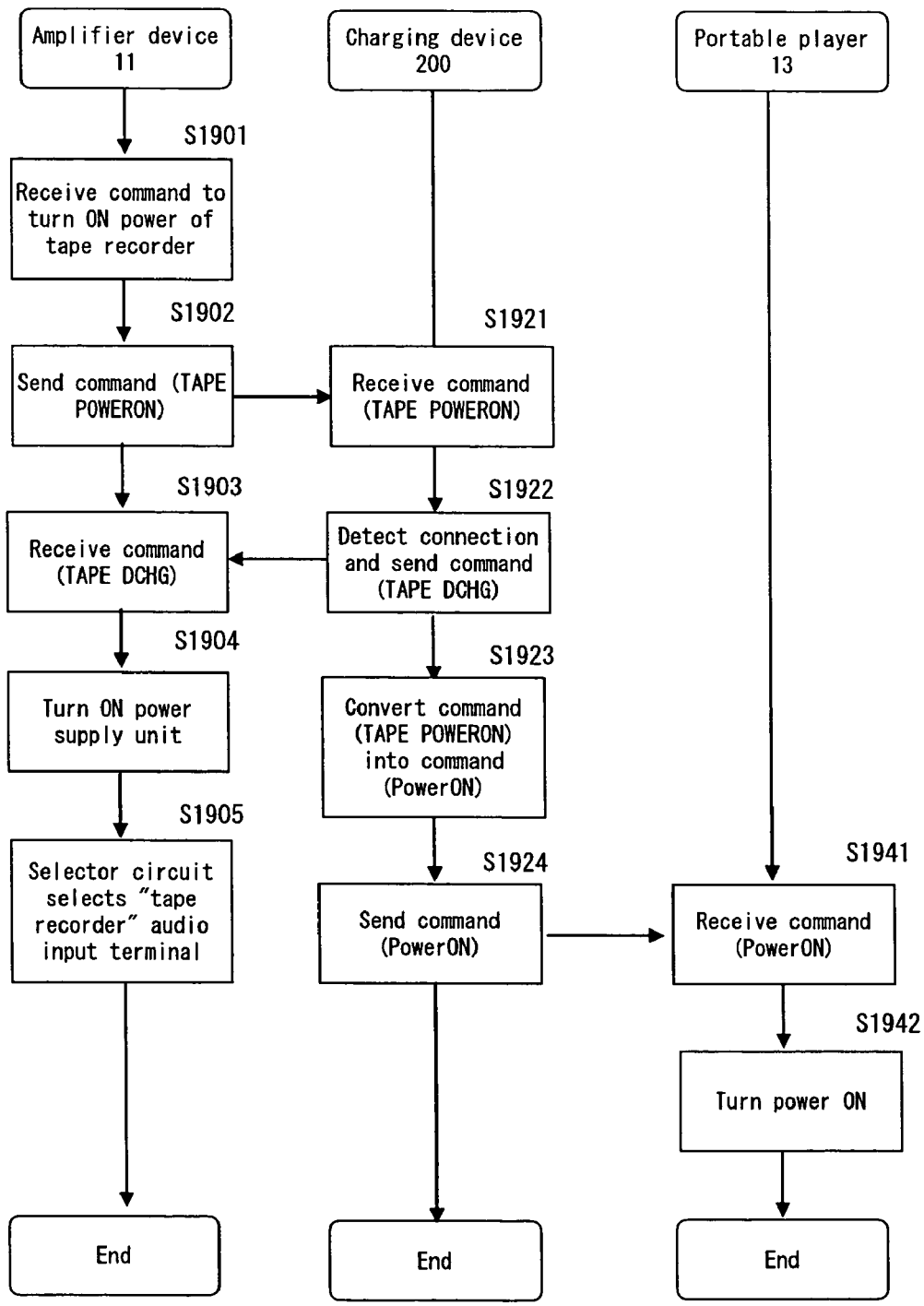
FIG. 19 is a flow chart showing a POWER_ON operation.

This example is directed to a case where a command to turn ON the power of a tape recorder is input to the amplifier device 11 through an operation by the operator. Referring to FIG. 19, when the amplifier device 11 receives a command to turn ON the power of a tape recorder through an operation by the operator (S1901), the amplifier device 11 sends a first command (TAPE POWERON) to turn ON the power of the tape recorder to the charging device 200 (S1902). When the charging device 200 receives the first command (TAPE POWERON) (S1921), if the connection detection section determines that a portable player is connected, the charging device 200 sends the amplifier device 11 a first command (TAPE DCHG) to control the selector circuit to select the "tape recorder" audio input terminal (corresponding to the device type selected by the device type selection switch 201) (S1922). When the amplifier device 11 receives the first command (TAPE DCHG) (S1903), the amplifier device 11 turns ON the power supply unit 609 (S1904) and controls the selector circuit 604 to select the "tape recorder" audio input terminal (S1905). The charging device 200 converts the first command (TAPE POWERON) into a second command (PowerON) based on the command conversion table (S1923), and sends the second command to the portable player 13 (S1924). When the portable player 13 receives the second command (PowerON) (S1941), the portable player 13 turns the power ON (S1942). Note that in S1922, the first command is sent to the amplifier device 11 only when it is determined that a portable player is connected and it is not sent to the amplifier device 11 when it is determined that a portable player is not connected, whereby it is possible to prevent power from being wasted by turning ON the power supply unit of the amplifier device 11 even though a portable player is not connected.

[REPRODUCTION Operation]

Figure 20:
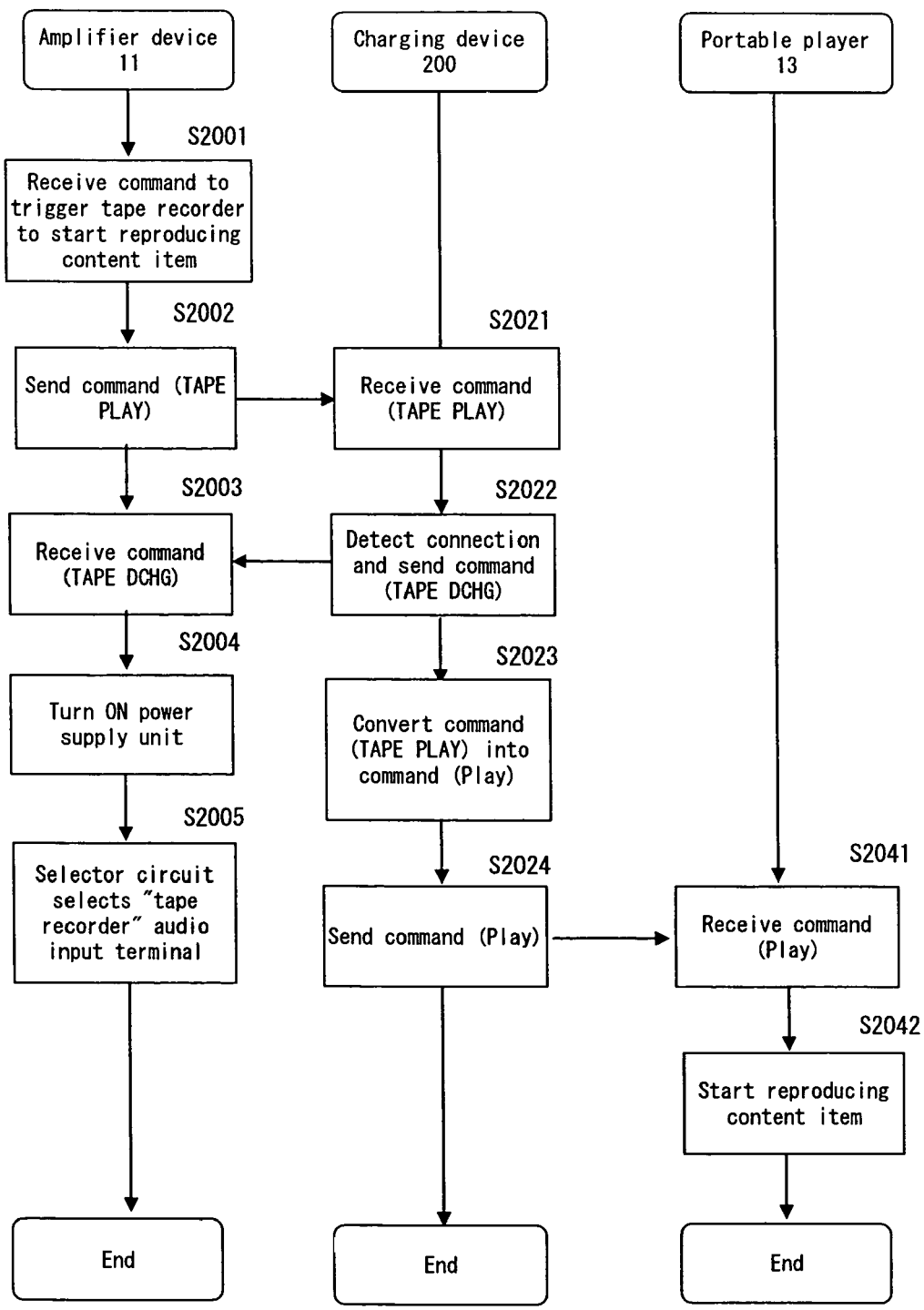
FIG. 20 is a flow chart showing a REPRODUCTION operation.

This example is directed to a case where the operator using a remote controller inputs to the amplifier device 11 a command to reproduce a content item by a tape recorder. Referring to FIG. 20, when the amplifier device 11 receives the command to trigger the tape recorder to start reproducing a content item via a remote controller signal receiving circuit (S2001), the amplifier device 11 sends the charging device 200 a first command (TAPE PLAY) to trigger the tape recorder to start reproducing a content item (S2002). When the charging device 200 receives the first command (TAPE PLAY) (S2021), the charging device 200 sends the amplifier device 11 a first command (TAPE DHCG) to control the selector circuit to select the "tape recorder" audio input terminal (corresponding to the device type selected by the device type selection switch 201) (S2022) if the connection detection section determines that a portable player is connected. When the amplifier device 11 receives the first command (TAPE DCHG) (S2003), the amplifier device 11 turns ON the power supply unit 609 if it is OFF (S2004), and controls the selector circuit 604 to select the "tape recorder" audio input terminal (S2005). The charging device 200 converts the first command (TAPE PLAY) into a second command (Play) based on the command conversion table (S2023), and sends the second command to the portable player 13 (S2024). When the portable player 13 receives the second command (Play) (S2041), the portable player 13 starts reproducing a content item (S2042). Note that in S2022, the first command is sent to the amplifier device 11 only when it is determined that a portable player is connected and it is not sent to the amplifier device 11 when it is determined that a portable player is not connected, whereby it is possible to prevent power from being wasted by turning ON the power of the amplifier device 11 even though a portable player is not connected.

[PAUSE Operation]

Figure 21:
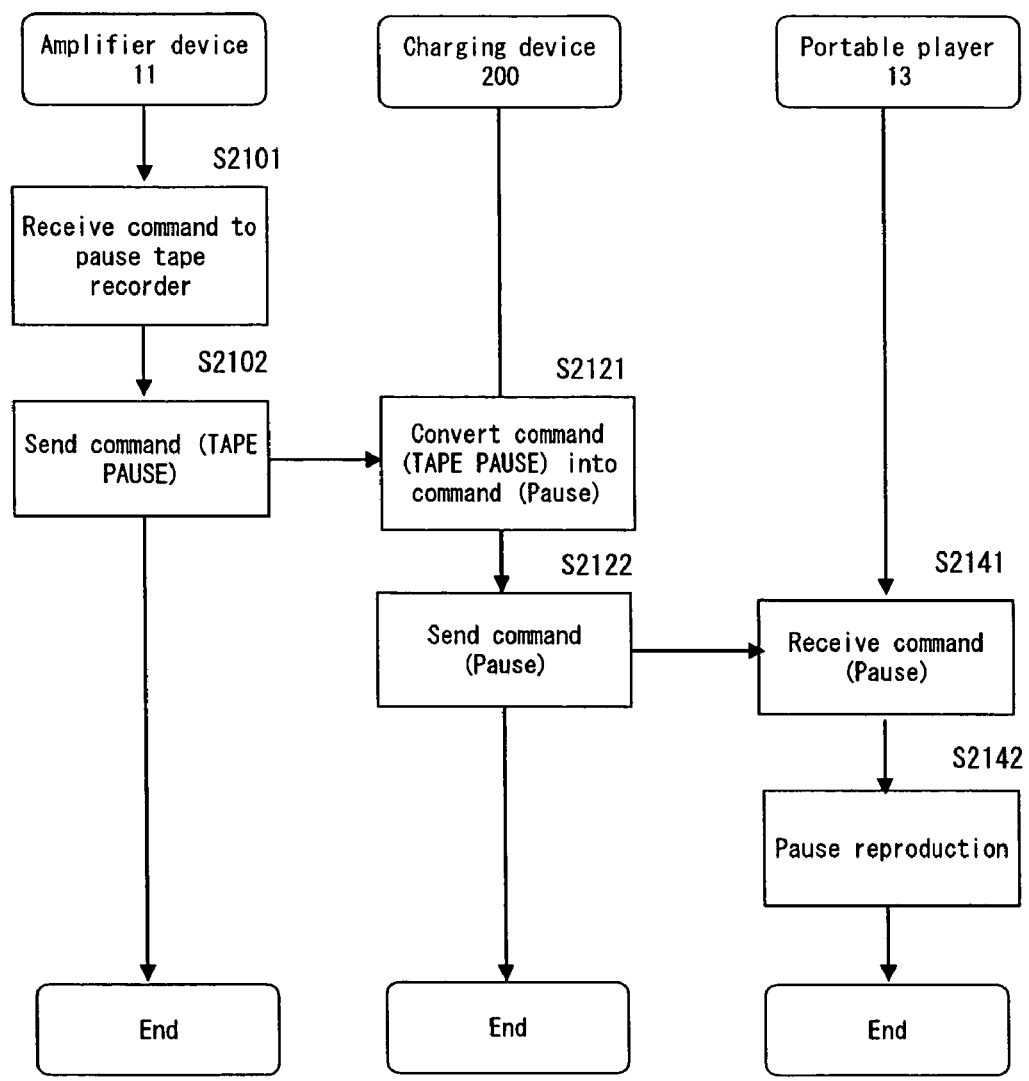
FIG. 21 is a flow chart showing a PAUSE operation.

This example is directed to a case where the operator using a remote controller inputs to the amplifier device 11 a command to pause the reproduction of a content item by a tape recorder. Referring to FIG. 21, when the amplifier device 11 receives a command to pause the reproduction operation by the tape recorder via a remote controller signal receiving circuit (S2101), the amplifier device 11 sends a first command (TAPE PAUSE) to the charging device 200 (S2102). When the charging device 200 receives the first command (TAPE PAUSE), the charging device 200 converts the first command into a second command (Pause) based on the command conversion table (S2121), and sends the second command to the portable player 13 (S2122). When the portable player 13 receives the second command (Pause) (S2141), the portable player 13 pauses the reproduction operation (S2142).

[Other Operations]

The charging device 200 operates in a manner similar to that described above with reference to FIG. 21 in response to other commands. Specifically, when the charging device 200 receives from the amplifier device 11 a command (TAPE STOP) to stop the operation of a tape recorder, a command (TAPE FF) to fast-forward a tape recorder, a command (TAPE REW) to rewind a tape recorder, or a command (TAPE STANBY) to bring a tape recorder to a standby state, the charging device 200 converts the command into a second command, and sends the second command to the portable player 13. This similarly applies to yet other commands. An operation (second command) that is unique to portable players and is not used with other types of content reproduction devices (e.g., CD players) may be assigned to a first command of the other types of content reproduction devices. For example, a first command (TAPE DISPLAY) to change the display screen may be converted into a second command (BackLightOn) to light the backlight, or a first command (TAPE PROGRAM) to start a programmed reproduction operation may be converted into a second command (PlayListUp) to move from one playlist to another.

Another preferred embodiment of the present invention will now be described. Referring to FIG. 2, the command conversion device 14 (the charging device 200) further includes a command input button (command input section) 212. When the command input button is pressed (operated) by the operator, the command conversion device 14 sends the amplifier device 11 a first command to turn ON the power of the amplifier device 11 and switch the selector circuit or a first command to turn OFF the power of the amplifier device 11. The command to be sent is determined based on whether or not a portable player is connected to the charging device. In other words, the system operation section 202A sends an optimal first command to the amplifier device 11 based on the decision by the system operation section 202A whether or not a command input button is pressed and the decision by the connection detection section 202C whether or not the portable player 13 is connected.

Figure 22:
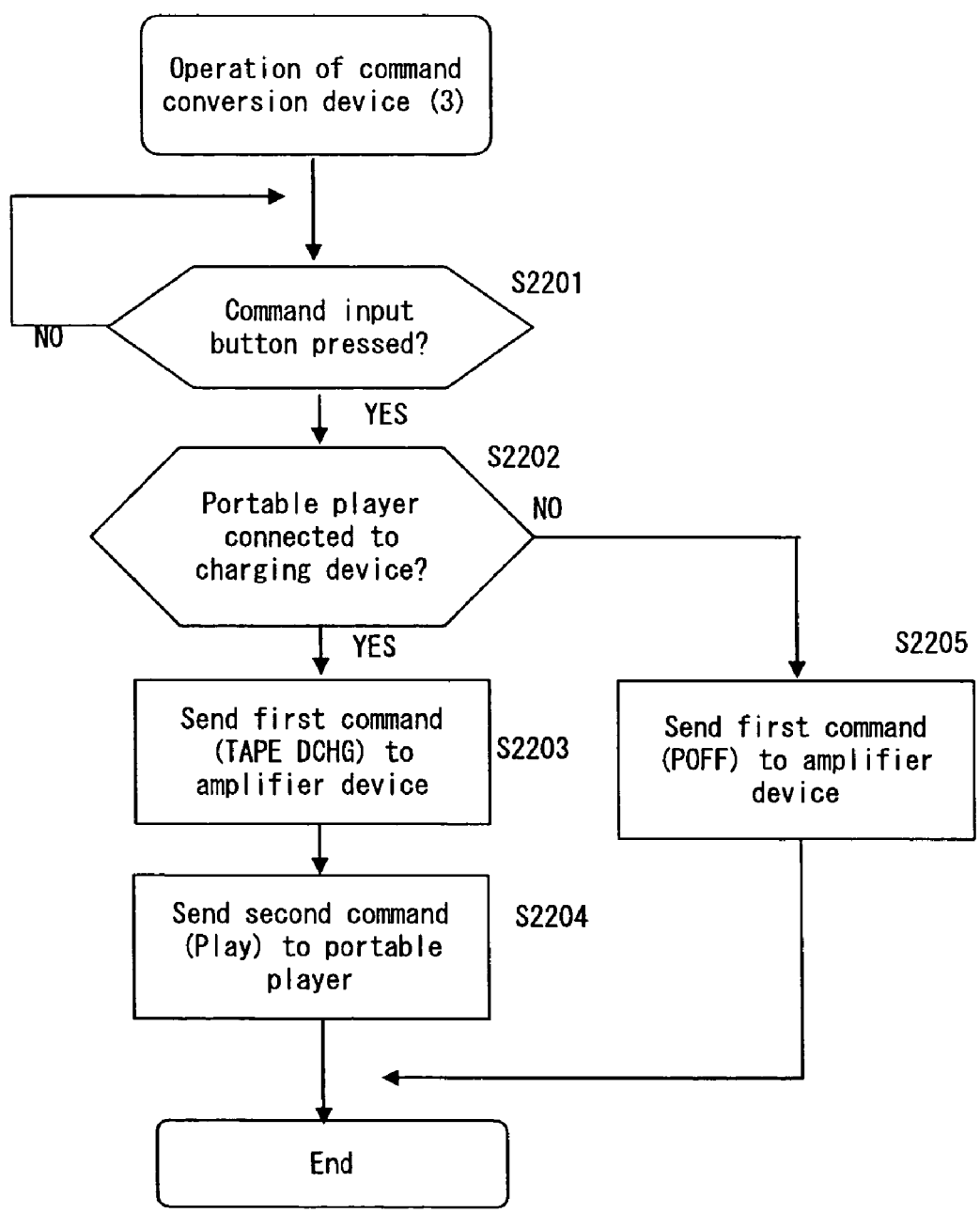
FIG. 22 is a flow chart showing an operation of a charging device according to another embodiment of the present invention.

First, the operation of the command conversion device 14 will be described with reference to FIG. 22. When the system operation section 202A determines that the command input button 212 is pressed (YES in S2201), the connection detection section 202C determines whether or not the portable player 13 is connected (S2202). If the portable player 13 is connected (YES in S2202), the system operation section 202A sends a first command (TAPE DCHG) to the amplifier device 11 (S2203) and sends a second command (Play) to the portable player 13 (S2204). If the portable player 13 is not connected (NO in S2202), the system operation section 202A sends a first command (POFF) to the amplifier device 11 (S2205).

Figure 23:
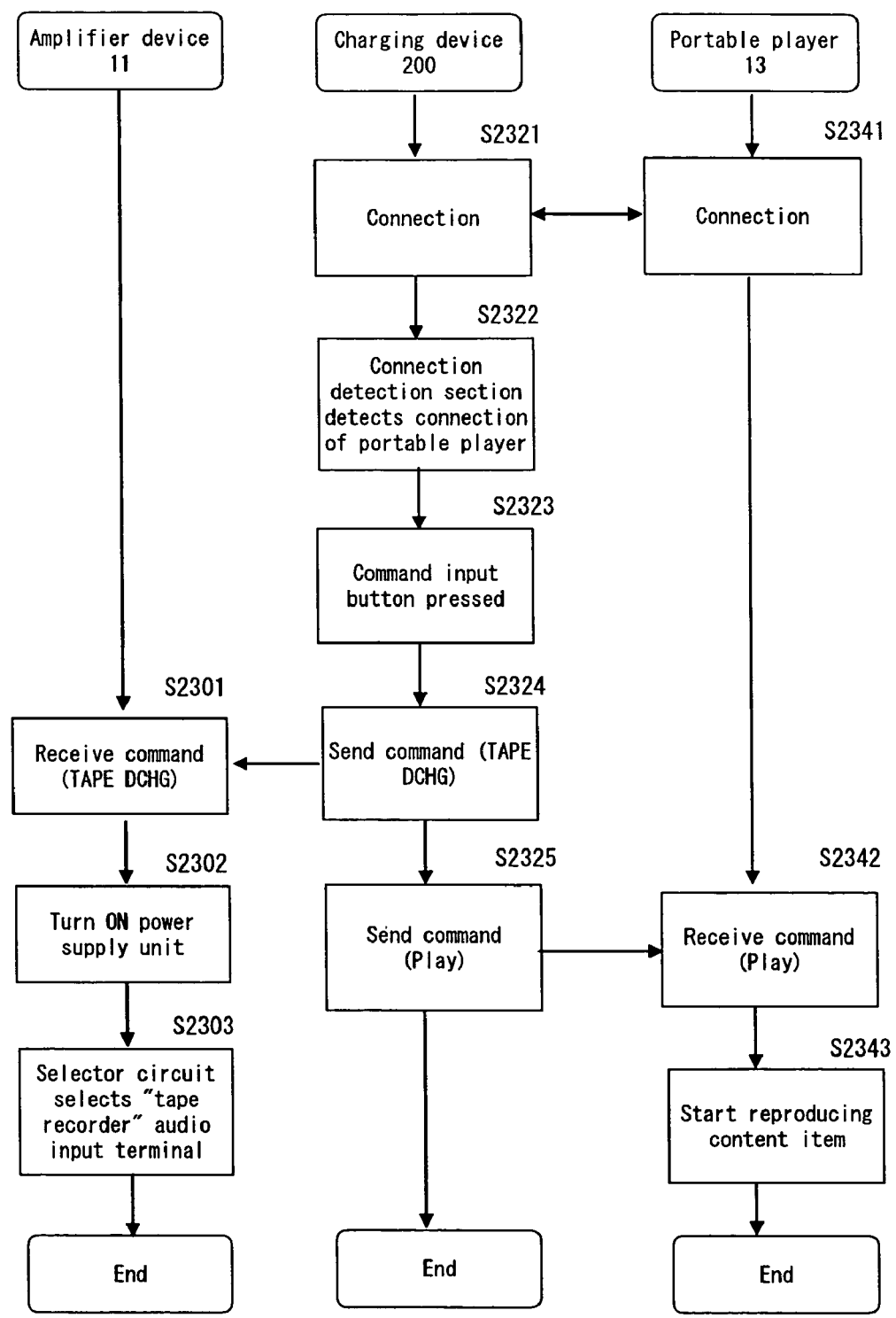
FIG. 23 is a flow chart showing an operation of a system when a command input button is pressed while a portable player is connected.

The operation of the content reproduction system of the present embodiment as a whole will now be described. First, referring to FIG. 23, an operation where the portable player 13 is connected to the charging device 200 will be described. When the portable player 13 is connected to the charging device 200 (S2321, S2341), the connection detection section 202C detects that the portable player 13 is connected (S2322). When the system operation section 202A of the charging device 200 determines that the command input button is pressed (S2323), the system operation section 202A sends a first command (TAPE DCHG) to the amplifier device 11 (S2324). When the amplifier device 11 receives the first command (TAPE DCHG), the amplifier device 11 turns ON the power supply unit (S2302), and controls the selector circuit to select the "tape recorder" audio input terminal (corresponding to the device type selected by the device type selection switch 201) (S2303). The charging device 200 sends a second command (Play) to the portable player 13 (S2325). When the portable player 13 receives the second command (Play) (S2342), the portable player 13 starts reproducing a content item (S2343).

Figure 24:
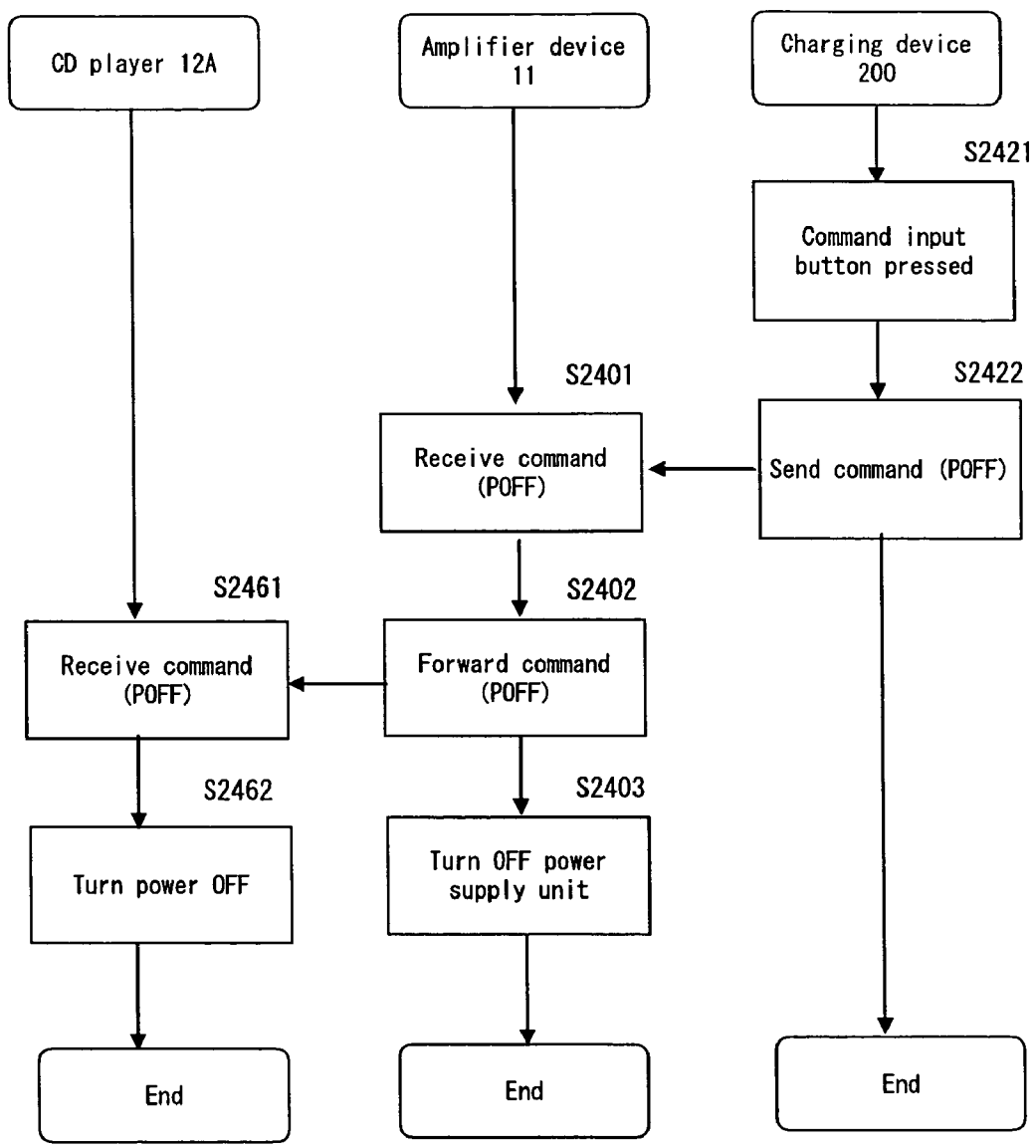
FIG. 24 is a flow chart showing an operation of a system when a command input button is pressed while a portable player is not connected.

Referring to FIG. 24, an operation where the portable player 13 is not connected to the charging device 200 will now be described. When the system operation section 202A of the charging device 200 determines that the command input button is pressed (S2421), the system operation section 202A sends a first command (POFF) to the amplifier device 11 (S2422). When the amplifier device 11 receives the first command (POFF) (S2401), the amplifier device 11 forwards the first command (POFF) to the CD player 12A (S2402) and turns OFF the power supply unit (S2403). When the CD player 12A receives the first command (POFF) (S2461), the CD player 12A turns the power OFF (S2462).

As described above, in the present embodiment, when the command input button is pressed while the portable player 13 is being connected to the charging device 200, the power of the amplifier device 11 is turned ON and the selector circuit is controlled to select the "tape recorder" audio input terminal, whereby the portable player can reproduce a content item. On the other hand, when the command input button is pressed after the portable player 13 has been removed from the charging device 200 (i.e., while the portable player 13 is not being connected to the charging device 200), the amplifier device 11 (and the other content reproduction devices 12 such as the CD player 12A) can automatically be turned OFF. Thus, with the operator simply pressing the command input button, the charging device 200 automatically sends an optimal first command to the amplifier device 11 based on the result of the connection detection, whereby an optimal second command can be sent to the portable player 13.

While preferred embodiments of the present invention have been described above, it is understood that the present invention is not limited thereto. The content reproduction device 12 and the command conversion device 14 may be connected in series with the amplifier device 11 via a communications cable. Content items to be reproduced by the content reproduction device 12 is not limited to audio content items, but may alternatively be other types of content items, such as video and still images. The device type selection switch 201 may include positions for an analog reproduction device (e.g., an analog tape recorder) and a digital reproduction device (e.g., a digital tape recorder (DAT)). The audio signal input/output terminal may be a digital input/output terminal. The present invention may be provided in the form of a computer program for instructing a computer to perform operations as described above.

The present invention can suitably be used in applications in which a portable player (e.g., an HDD player or an MD player) is used in combination with a content reproduction system including an amplifier device, a CD player, an MD recorder, etc., wherein the portable player is not compatible with the type or types of commands of the system.

What is claimed is:

1. A command conversion device, comprising:
a connector to be connected to an amplifier device which sends/receives a plurality of different types of first commands and performs an operation in relation to a first command and which is connectable to a plurality of types of reproduction devices respectively corresponding to the plurality of different types of first commands, wherein the device type corresponds to a reproduction type, and the connector also to be connected to a content reproduction device which sends/receives a second command and performs an operation in relation to the second command;
- a selector for selecting which type of reproduction device different from a type of the content reproduction device the amplifier assumes the content reproduction device is from among the plurality of types of reproduction devices respectively corresponding to the plurality of different types of first commands; and
- a converter for, when first commands to control the reproduction device selected by the selector are received from the amplifier device, converting the received first commands into second commands and sending the second commands to the content reproduction device,
- wherein, with respect to each of the plurality of types of first commands, when the commands to control the reproduction device whose type is selected by the selector are input to the amplifier device by a user operation, the amplifier device sends the first commands whose type is selected by the selector to the command conversion device, and the converter sends the second commands of the type of the content reproduction device to the content reproduction device, so that the content reproduction device performs the operation.

2. The command conversion device according to claim 1, wherein when a second command is received from the content reproduction device, the converter converts the second command into a first command of the type selected by the selector and sends the first command to the amplifier device.

3. The command conversion device according to claim 2, wherein when a second command indicating that a power of the content reproduction device has been turned ON or a second command indicating that the content reproduction device has started a reproduction operation is received, the converter converts the second command into a first command to turn ON a power of the amplifier device and a first command to select an audio input terminal corresponding to the type selected by the selector and sends the first commands to the amplifier device.

4. The command conversion device according to claim 2, wherein the converter includes:
- a command conversion table containing the plurality of types of first commands each associated with a second command; and
- a conversion section for converting a first command into a second command associated with the first command or converting a second command into a first command associated with the second command based on a selection status of the selector and the command conversion table.

5. The command conversion device according to claim 1, further comprising a connection detector for detecting whether or not the content reproduction device is connected,
- wherein when a first command of the type selected by the selector is received, a predetermined first command is sent to the amplifier device if the connection detector detects that the content reproduction device is connected, whereas the first command is not sent to the amplifier device if the connection detector detects that the content reproduction device is not connected.

6. The command conversion device according to claim 5, wherein when a first command of the type selected by the selector to turn a power ON or a first command of the type selected by the selector to start a reproduction operation is received, if the connection detector detects that the content reproduction device is connected, a first command to turn a power ON and a first command to select an audio input terminal corresponding to the type selected by the selector are sent to the amplifier device, and a second command to turn a power ON and a second command to start a reproduction operation are sent to the content reproduction device.

7. The command conversion device according to claim 1, wherein when a first command of a type that is not being selected by the selector is received from the amplifier device, the converter does not send the second command corresponding to the received first command to the content reproduction device.

8. The command conversion device according to claim 1, further comprising:
- a connection detector for determining whether or not the content reproduction device is connected;
- a command input section;
- a determination section for determining whether or not the command input section is operated; and
- a command transmitter for sending a first command to the amplifier device or sending a second command to the content reproduction device based on the decision by the connection detector and the decision by the determination section.

9. The command conversion device according to claim 8, wherein:
- if the determination section determines that the command input section is operated and the connection detector determines that the content reproduction device is connected, the command transmitter sends the amplifier device at least one of a first command to turn a power ON and a first command to control the selector to select the audio signal input terminal corresponding to the type selected by the selector and sends the content reproduction device a second command to start a reproduction operation; and
- if the determination section determines that the command input section is operated and the connection detector determines that the content reproduction device is not connected, the command transmitter sends the amplifier device a first command to turn a power OFF.

10. The command conversion device according to claim 1, wherein the type of the reproduction device and the type of the content reproduction device are at least two of tape, CD, MD, DVD, and portable hard disk.

11. A charging device for a content reproduction device, the charging device comprising:
- a connector to be connected to an amplifier device which sends/receives a plurality of different types of first commands and performs an operation in relation to a first command and which is connectable to a plurality of types of reproduction devices respectively corresponding to the plurality of different types of first commands, wherein the device type corresponds to a reproduction type, and the connector also to be connected to a content reproduction device which sends/receives a second command and performs an operation in relation to the second command;
- a selector for selecting which type of reproduction device different from a type of the content reproduction device the amplifier assumes the content reproduction device is from among the plurality of types of reproduction devices respectively corresponding to the plurality of different types of first commands; and
- a converter for, when first commands to control the reproduction device selected by the selector are received from the amplifier device, converting the received first commands into second commands and sending the second commands to the content reproduction device;

a power supply circuit for supplying a power supply voltage to the content reproduction device;

an audio signal receiver for receiving an audio signal from the content reproduction device; and an audio signal transmitter for sending the audio signal to the amplifier device, wherein, with respect to each of the plurality of types of first commands, when the commands to control the reproduction device whose type is selected by the selector are input to the amplifier device by a user operation, the amplifier device sends the first commands whose type is selected by the selector to the command conversion device, and the converter sends the second commands of the type of the content reproduction device to the content reproduction device, so that the content reproduction device performs the operation.

12. The charging device according to claim 11, wherein when a second command is received from the content reproduction device, the converter converts the second command into a first command of the type selected by the selector and sends the first command to the amplifier device.

13. The charging device according to claim 11, wherein when a first command of a type that is not being selected by the selector is received from the amplifier device, the converter does not send the second command corresponding to the received first command to the content reproduction device.

14. The charging device according to claim 11, wherein the type of the reproduction device and the type of the content reproduction device are at least two of tape, CD, MD, DVD, and portable hard disk.

* * * * *